US007971242B2

(12) United States Patent
Tsuchitoi

(10) Patent No.: US 7,971,242 B2
(45) Date of Patent: Jun. 28, 2011

(54) PRINTING SYSTEM

(75) Inventor: Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1112 days.

(21) Appl. No.: 11/733,928

(22) Filed: Apr. 11, 2007

(65) Prior Publication Data
US 2008/0028448 A1 Jan. 31, 2008

(30) Foreign Application Priority Data

Apr. 13, 2006 (JP) ................................. 2006-111366

(51) Int. Cl.
*H04L 9/32* (2006.01)
(52) U.S. Cl. ................... 726/20; 726/19; 726/4; 726/18
(58) Field of Classification Search ................ 726/9, 26, 726/27, 28, 29; 713/224, 201, 212, 213, 713/220, 223
See application file for complete search history.

(56) References Cited

U.S. PATENT DOCUMENTS

2006/0079206 A1* 4/2006 Kim .............................. 455/411
2006/0098226 A1* 5/2006 Morita ......................... 358/1.15

FOREIGN PATENT DOCUMENTS

JP 11-134136 5/1999

* cited by examiner

*Primary Examiner* — Brandon S Hoffman
*Assistant Examiner* — Nega Woldemariam
(74) *Attorney, Agent, or Firm* — Cowan, Liebowitz & Latman, P.C.

(57) ABSTRACT

This invention provides a printing system which reduces cost while stably operating an authentication server function associated with a print process. To accomplish this, this invention relates to a printing system including a plurality of authentication servers, a client communicable with the authentication servers, and a printing apparatus. The client gains access with user authentication information, and outputs a print job containing response access restriction information. The authentication server issues access restriction information to the client. The printing apparatus holds decryption information to decrypt the encrypted access restriction information, and determines whether decryption information corresponding to an identifier is held. When determining that no corresponding decryption information is held, the printing apparatus obtains the decryption information, and performs verification based on the obtained or held decryption information.

14 Claims, 28 Drawing Sheets

FIG. 5

| USER NAME (501) | PASSWORD (502) | MAXIMUM SHEET COUNT (503) | ACTUAL SHEET COUNT (504) | PRINT RESTRICTION (505) |
|---|---|---|---|---|
| User1 | Akd5sj4f | 500 | 123 | MONOCHROME/ DOUBLE-SIDED (511) |
| User2 | saFjf98w | 1000 | 515 | ONLY MONOCHROME (512) |
| User3 | vGks9jg1a | 2000 | 1021 | NONE (513) |
| Guset | NONE | 0 | 0 | NONE (514) |

FIG. 11

```
MAX_PRINT=100
STRICT_DUPLEX=TRUE
STRICT_Nin1=2
STRICT_MONOCOLOR=TRUE
```

FIG. 26

STATUS=OK

PRINTING SYSTEM

BACKGROUND OF THE INVENTION

1. Field of the Invention

The present invention relates to a printing system having an authentication function.

2. Description of the Related Art

These days, TCO (Total Cost of Ownership) reduction in a printing system in the office environment is becoming more and more important. To reduce TCO, attention is paid not only to reduction of the initial installation cost of a printing apparatus and system, but also to reduction of the cost of consumables such as print sheets and coloring materials typified by toner. Cost reduction of consumables is very important for cost reduction in the office and global environmental conservation.

As a conventional problem, anyone can print using a printing apparatus installed in the office as long as he can access the network. The printing apparatus neither puts printing restriction on anyone nor leaves the trace of printing. A user is free from any psychological inhibition and may print out more than necessary. This unnecessarily increases TCO.

Japanese Patent Laid-Open No. 11-134136 discloses an information processing apparatus having a user restriction function of restricting an output for each user. The information processing apparatus can effectively reduce TCO because it restricts an output for each user.

As the printing system is growing to a large scale, an authentication server system which restricts functions may be arranged outside a printing apparatus, and the server computer may perform authentication and the like. In a large-scale office or the like, hundreds or thousands of host computers may be installed. However, in a form in which one authentication server system executes authentication requested from many host computers, the authentication server may put an excessive load, causing an error. For example, when accesses from many external devices may exceed the limit of the capacity, the authentication server may break down. The authentication server greatly slows down due to an excessive load. As a result, there is a problem that the print process becomes delayed and usability degrades.

SUMMARY OF THE INVENTION

The present invention enables realization of a printing system which reduces cost while stably operating an authentication server function associated with a print process.

One aspect of the present invention provides a printing system including a plurality of authentication servers, a client communicable with the authentication servers, and a printing apparatus, the client comprising: an accessing unit adapted to gain access with user authentication information to any authentication server assigned among the plurality of authentication servers; and a print job output unit adapted to output, to the printing apparatus, a print job containing access restriction information sent back from the any authentication server in response to the access, the authentication server comprising: an issuing unit adapted to issue, to the client on the basis of the user authentication information notified from the client, an identifier of the authentication server and access restriction information having undergone an encryption process with encryption information held in the authentication server, and the printing apparatus comprising: a holding unit adapted to hold decryption information to decrypt the encryption process performed on the received access restriction information; a determining unit adapted to determine whether the holding unit holds the decryption information corresponding to the identifier of the any authentication server contained in the received print job; an obtaining unit adapted to, when the determining unit determines that the holding unit does not hold the decryption information, obtain the decryption information corresponding to the identifier; a verifying unit adapted to perform verification on the basis of the decryption information obtained by the obtaining unit or the held decryption information; and a job execution controlling unit adapted to control execution of a print job on the basis of the verification by the verifying unit.

Another aspect of the present invention provides a printing system comprising: an inputting unit adapted to input access restriction information issued in accordance with user authentication information from any authentication server assigned among a plurality of authentication servers; an obtaining unit adapted to determine, on the basis of the access restriction information input by the inputting unit, whether decryption information corresponding to the assigned any authentication server is held, and when determining that the decryption information is not held, obtain the decryption information corresponding to the assigned any authentication server; a verifying unit adapted to perform verification on the basis of the decryption information obtained by the obtaining unit or the held decryption information; and a job execution controlling unit adapted to control execution of a job on the basis of the verification by the verifying unit.

Still another aspect of the present invention provides a method for controlling a printing system including a plurality of authentication servers, a client communicable with the authentication servers, and a printing apparatus, comprising the steps of: gaining access with user authentication information to any authentication server assigned among the plurality of authentication servers; issuing, on the basis of the notified user authentication information, an identifier of the authentication server and access restriction information having undergone an encryption process with encryption information held in the authentication server; outputting a print job containing the issued access restriction information to the printing apparatus; determining whether a holding unit adapted to hold decryption information to decrypt the encryption process performed on the received access restriction information holds the decryption information in correspondence with the identifier of the any authentication server contained in the received print job; obtaining the decryption information corresponding to the identifier when the holding unit is determined in the determining step not to hold the decryption information corresponding to the identifier; performing verification on the basis of the decryption information obtained in the obtaining step or the held decryption information; and controlling execution of a print job on the basis of the verification in the verifying step.

Yet another aspect of the present invention provides a method for controlling a printing system, comprising the steps of: inputting access restriction information issued in accordance with user authentication information from any authentication server assigned among a plurality of authentication servers; determining, on the basis of the input access restriction information, whether decryption information corresponding to the assigned any authentication server is held, and when determining that the decryption information is not held, obtaining the decryption information corresponding to the assigned any authentication server; performing verification on the basis of the decryption information obtained in the obtaining step or the held decryption information; and controlling execution of a job on the basis of the verification in the verifying step.

Still yet another aspect of the present invention provides a computer-readable storage medium storing a computer program for causing a computer to execute a method for controlling a printing system including a plurality of authentication servers, a client communicable with the authentication servers, and a printing apparatus, the computer program comprising the steps of: gaining access with user authentication information to any authentication server assigned among the plurality of authentication servers; issuing, on the basis of the notified user authentication information, an identifier of the authentication server and access restriction information having undergone an encryption process with encryption information held in the authentication server; outputting a print job containing the issued access restriction information to the printing apparatus; determining whether a holding unit adapted to hold decryption information to decrypt the encryption process performed on the received access restriction information holds the decryption information in correspondence with the identifier of the any authentication server contained in the received print job; obtaining the decryption information corresponding to the identifier when the holding unit is determined in the determining step not to hold the decryption information corresponding to the identifier; performing verification on the basis of the decryption information obtained in the obtaining step or the held decryption information; and controlling execution of a print job on the basis of the verification in the verifying step.

Yet still another aspect of the present invention provides a computer-readable storage medium storing a computer program for causing a computer to execute a method for controlling a printing system, the computer program comprising the steps of: inputting access restriction information issued in accordance with user authentication information from any authentication server assigned among a plurality of authentication servers; determining, on the basis of the input access restriction information, whether decryption information corresponding to the assigned any authentication server is held, and when determining that the decryption information is not held, obtaining the decryption information corresponding to the assigned any authentication server; performing verification on the basis of the decryption information obtained in the obtaining step or the held decryption information; and controlling execution of a job on the basis of the verification in the verifying step.

Further features of the present invention will be apparent from the following description of exemplary embodiments with reference to the attached drawings.

BRIEF DESCRIPTION OF THE DRAWINGS

FIG. 5 is a table showing information associated with access restriction information held in an authentication server according to the first embodiment;

FIG. 11 is a view showing an example of the format of restriction information contained in an access restriction ticket according to the first embodiment;

FIG. 26 is a view showing information associated with access restriction information held in an authentication server according to another embodiment;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
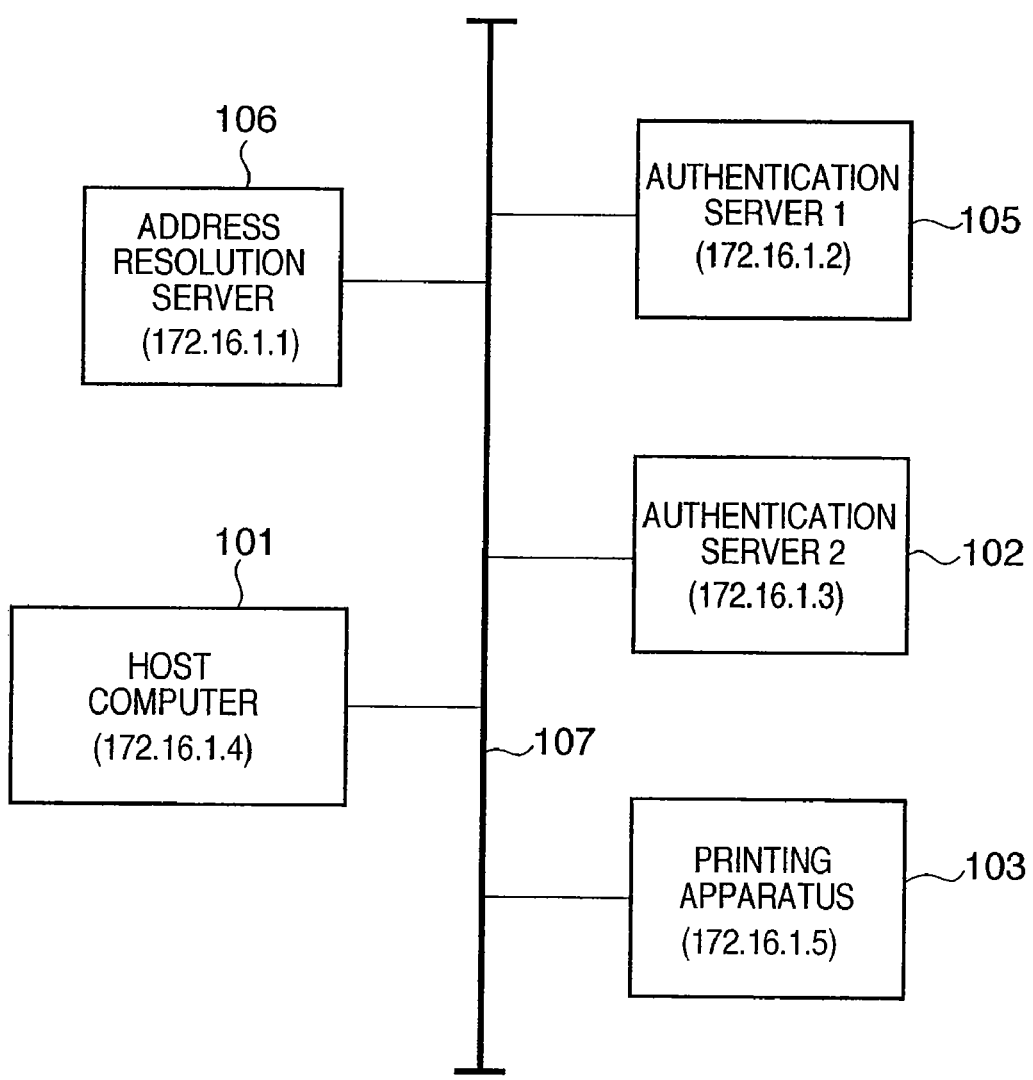
FIG. 1 is a block diagram showing the configuration of a printing system according to the first embodiment.

The first embodiment of the present invention will be described below. FIG. 1 is a block diagram showing the configuration of a printing system according to the first embodiment. For descriptive convenience, the number of components of each type is one or two. However, the present invention does not limit the number of components, and is also applicable to a large-scale printing system. In FIG. 1, apparatuses are classified by each function. However, some functions of a given apparatus may be built into another apparatus, and the system can be built with a flexible apparatus arrangement. In the following description, the printing system may mean a single apparatus, a plurality of apparatuses, or a system obtained by assembling some or all functions of a given apparatus into another apparatus, which will be described below. For example, a single printing apparatus to be described in the first to fourth embodiments may sometimes be called a printing system.

A printing system 100 comprises a host computer 101, authentication server 102, authentication server 105, printing apparatus 103, address resolution server 106, and network 107. The respective components (apparatuses) communicably connect to each other via the network 107. The user uses the host computer 101 to generate image data and print. The authentication servers 102 and 105 have user authentication information and access restriction information. The address resolution server 106 resolves addresses to the authentication servers 102 and 105 in accordance with a request from the host computer 101. The printing apparatus 103 receives print data via the network 107, and prints on an actual sheet by a known printing technique such as electrophotography or inkjet printing.

The host computer 101, authentication servers 102 and 105, address resolution server 106, and printing apparatus 103 connect to each other via the network 107 by a known technique such as Ethernet®. Each component is assigned a unique address, and has an IPv4 address such as a parenthesized 4-digit figure shown in FIG. 1.

Figure 2:
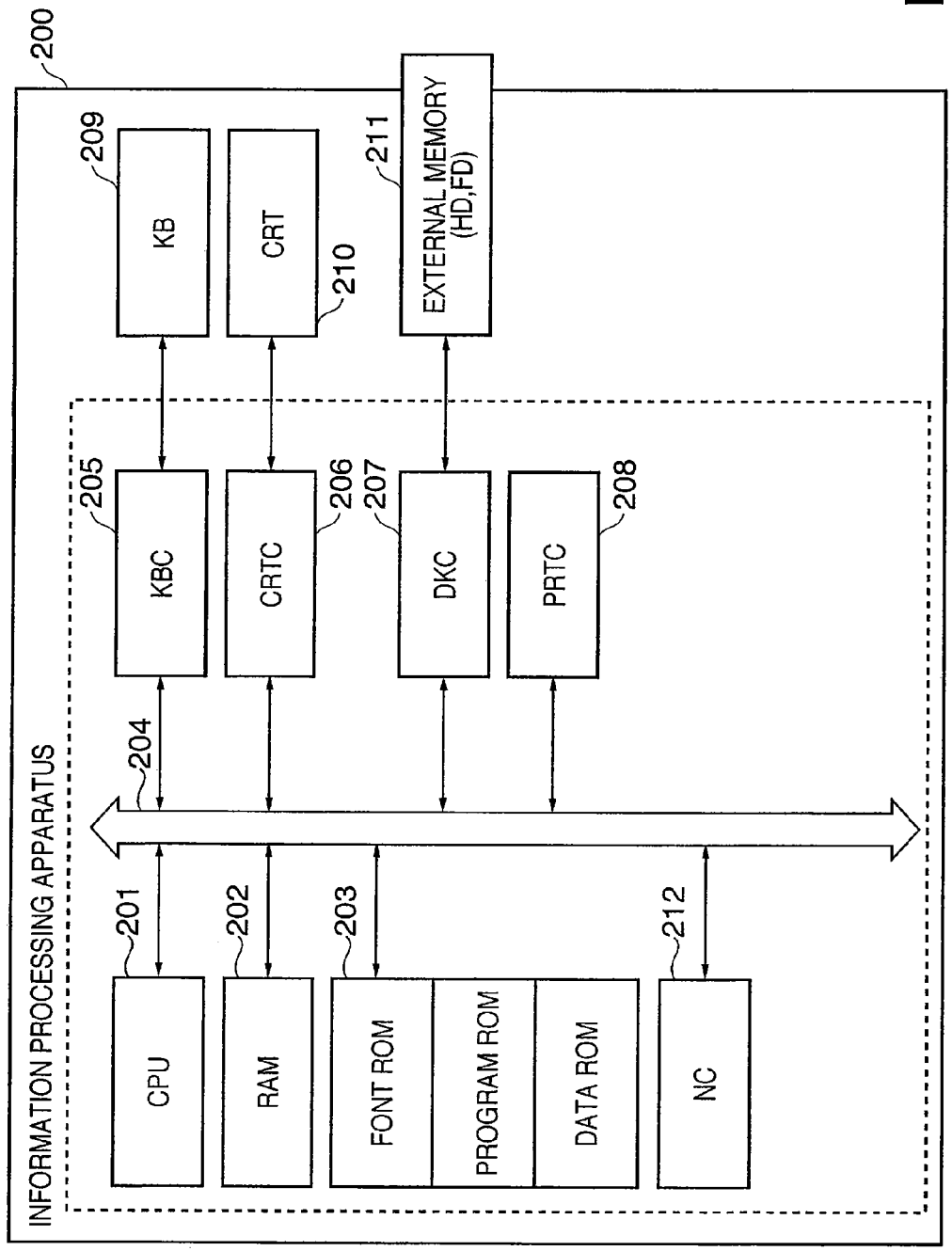
FIG. 2 is a block diagram showing an example of a controller according to the first embodiment.

An example of the hardware configuration of an information processing apparatus which can function as the host computer 101, authentication server 102, or address resolution server 106 according to the first embodiment will be explained with reference to FIG. 2. In FIG. 2, an information processing apparatus 200 comprises a CPU 201 which processes documents including graphics, images, texts, tables (including a spreadsheet and the like), and the like based on a document processing program or the like stored in the program ROM of a ROM 203 or an external memory 211. In the information processing apparatus 200, the CPU 201 controls all devices connected to a system bus 204.

The program ROM of the ROM 203 or the external memory 211 stores, for example, an operating system program serving as the control program of the CPU 201. The font ROM of the ROM 203 or the external memory 211 stores font data used in the document process and the like. The data ROM of the ROM 203 or the external memory 211 stores various data used to perform the document process and the like. A RAM 202 functions as a main memory, work area, and the like for the CPU 201.

A keyboard controller (KBC) 205 controls a key input from a keyboard (KB) 209 or a pointing device (not shown). A CRT controller (CRTC) 206 controls display on a CRT display (CRT) 210. Reference numeral 207 denotes a disk controller (DKC) which controls access to the external memory 211 such as a hard disk (HD) or floppy® disk (FD). The external memory 211 stores a boot program, various applications, font data, user files, edit files, a printer control command generation program (to be referred to as a printer driver hereinafter), and the like. A printer controller (PRTC) 208 connects to the printing apparatus 103 via a bidirectional interface (interface), and executes a communication control process with the printing apparatus 103. An NC 212 connects to the network to execute a communication control process with another device connected to the network. The NC 212 functions as an input/output means for inputting/outputting various data to/from an external device.

The CPU 201 develops (rasterizes) an outline font on a display information RAM set in, for example, the RAM 202, and enables WYSIWYG on the CRT 210. The CPU 201 opens various registered windows and executes various data processes based on commands input with the mouse cursor (not shown) or the like on the CRT 210. In printing, the user opens a window associated with print settings, and can set the printer and a print process method to the printer driver including selection of the print mode.

Figure 3:
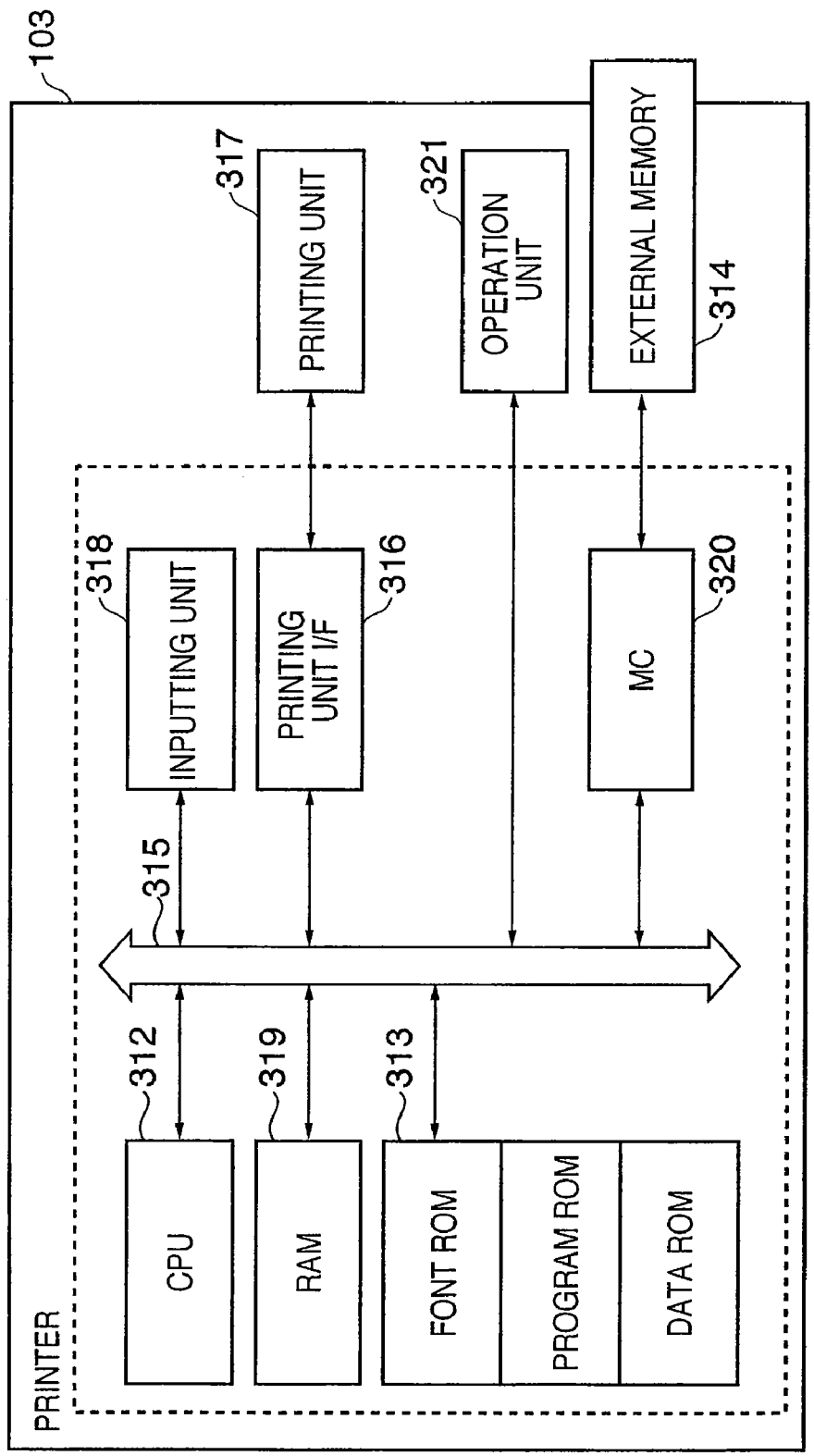
FIG. 3 is a block diagram showing an example of the hardware configuration of a printing apparatus according to the first embodiment.

An example of the hardware configuration of the printing apparatus 103 according to the first embodiment will be explained with reference to FIG. 3. A CPU 312 controls the printing apparatus 103. The CPU 312 of printer outputs an image signal to a printing unit (printer engine) 317 connected to a system bus 315 on the basis of, for example, a control program stored in a ROM 313 or a control program stored in an external memory 314. The image signal is generated based on print data stored in a print data storage unit in step S1606 of FIG. 17 (to be described later). The program ROM of the ROM 313 stores a control program for the CPU 312, and the like. The font ROM of the ROM 313 stores, for example, font data used to generate the output information. The data ROM of the ROM 313 stores, for example, information used in a host computer when the printer does not have the external memory 314 such as a hard disk.

The CPU 312 can communicate with the host computer via an inputting unit 318, and can notify the host computer 101 of internal information of the printer and the like. A RAM 319 functions as a main memory, work area, and the like for the CPU 312. The RAM 319 can increase its memory capacity by an optional RAM connected to an expansion port (not shown). The RAM 319 is used as an output information mapping area, environment data storage area, NVRAM, and the like. A memory controller (MC) 320 controls access to the external memory 314 such as a hard disk (HD) or IC card. The external memory 314 is connected as an option, and stores font data, an emulation program, form data, and the like. Reference numeral 321 denotes an operation unit having switches, an LED display, and the like for operation. The operation unit 321 also includes a touch panel type display, and can accept various operation settings.

The number of external memories 314 is not limited to one, and a plurality of external memories 314 may be arranged. A plurality of external memories which store an option card and a program for interpreting the printer control languages of different language systems in addition to built-in fonts are also connectable. Further, an NVRAM (not shown) may be adopted to store printer mode setting information from the operation unit 321.

<Sequence Chart of Overall System>

Figure 4:
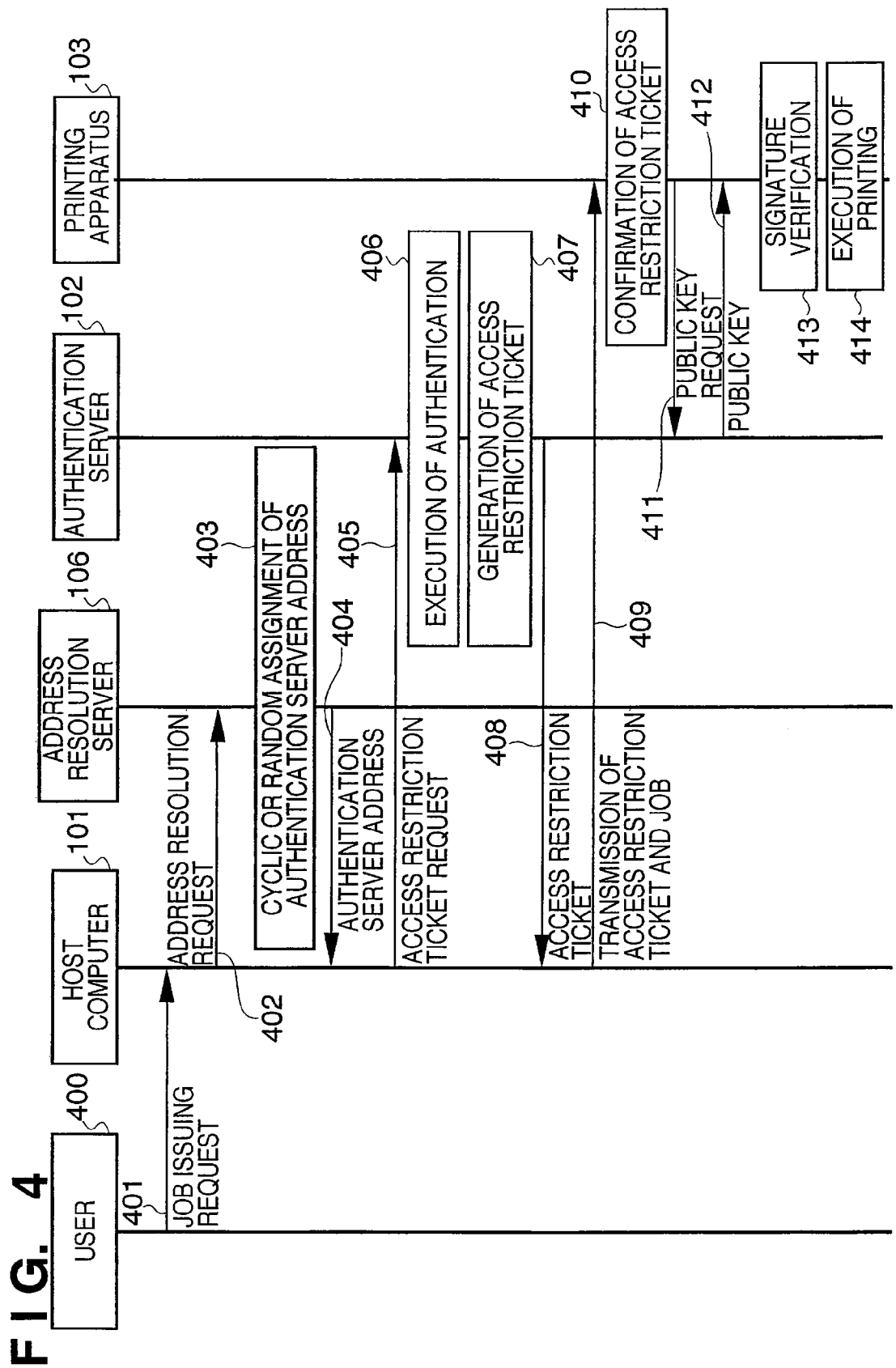
FIG. 4 is a sequence chart for explaining the process sequence of the overall system according to the first embodiment.

An outline of a print process in the printing system will be explained with reference to FIG. 4. FIG. 4 is a sequence chart for explaining the overall system according to the first embodiment. Reference numeral 400 denotes a user. In the following description, the authentication server 102 is selected from a plurality of authentication servers (authentication servers 102 and 105). The following description also applies to a case in which the authentication server 105 is selected.

In step S401, the user 400 inputs a print job issuing request to the host computer 101. In step S402, the host computer 101 requests the address resolution server 106 to resolve the address of the authentication server 102 in order to print. The purpose of this process is to obtain an access restriction ticket from the authentication server 102. The host computer 101 recognizes, by a name such as T"PrintService", a plurality of authentication servers which issue access restriction tickets. To resolve the name "PrintService" to a unique address, the host computer 101 issues a request to the address resolution server 106.

In step S403, the address resolution server 106 selects an arbitrary one of authentication servers periodically or at random based on the notified name "PrintService". In this case, the authentication server 102 is assigned as described above. In step S404, the address resolution server 106 returns (notifies) the address "172.16.1.3" (FIG. 1) of the authentication server 102 to the host computer 101. This address resolution mechanism is generally called "dynamic DNS".

In step S405, the host computer 101 requests the authentication server 102 to issue an access restriction ticket in accordance with the notified address. The host computer 101 outputs user authentication information such as the held user name and password of the user 400 to the authentication server 102, and inquires access restriction information. User authentication information is transmitted using a secure channel such as SSL (Secure Socket Layer) in order to protect confidentiality.

When receiving the access restriction ticket issuing request, the authentication server 102 determines in step S406 whether the transmitted user authentication information is authentic. In authentication, the authentication server 102 compares the notified user name and password with a user name and password held in the authentication server 102, and determines whether the notified authentication information is authentic. If authentication is successful, the authentication server 102 generates an access restriction ticket in step S407. The access restriction ticket is encrypted with encryption information held in the authentication server 102. Details of the access restriction ticket will be described with reference to FIG. 5. More specifically, the access restriction ticket contains address information (172.16.1.3) of the authentication server 102, and the result of the digital signature with the private key of the public key pair held in the authentication server 102. The address information is used as an identifier to identify the authentication server 102 by the printing apparatus 103 asked for a job using the access restriction ticket. The address information is not limited to the IP address and may be a physical (MAC) address as long as it can uniquely identify the authentication server 102. When a unique authentication server name is assigned to the authentication server 102, the address information may be the authentication server name. In any case, the address information is arbitrary as long as it functions as an identifier to uniquely identify the authentication server 102. After generating the access restriction ticket, the authentication server 102 returns (responds) it to the host computer 101 in step S408.

In step S409, the host computer 101 adds the access restriction ticket returned from the authentication server to data on the print job requested by the user 400. Then, the host computer 101 outputs a print job containing the access restriction ticket to the printing apparatus 103.

When notified of the print job, the printing apparatus 103 confirms the transmitted access restriction ticket in step S410. The printing apparatus 103 determines whether it has a public key corresponding to the address information of the authentication server 102 contained in or added to the access restriction ticket. If the printing apparatus 103 determines that it does not have the public key, it requests the authentication server 102 to obtain the public key in step S411 in accordance with the verified address information of the authentication server. The public key to be obtained may be a public key corresponding to a new authentication server, or a public key changed from one corresponding to a recognized authentication server.

In step S411, the printing apparatus 103 obtains the public key serving as decryption information via the network in accordance with the authentication server address information contained in or added to the access restriction ticket. However, the public key obtaining method is not limited to this. For example, when a MAC address or authentication server name is applied to an assigned authentication server identifier, the printing apparatus 103 obtains an authentication server address from a DNS server or the like using the MAC address or authentication server name. The printing apparatus 103 may obtain the public key as decryption information in accordance with the obtained address. That is, the obtainment of decryption information (e.g., public key) corresponding to an authentication server identifier contained in access restriction information is a characteristic operation.

In step S412, the printing apparatus 103 receives the public key from the authentication server 102 and stores it in the public key storage unit. In step S413, the printing apparatus 103 verifies a signature contained in the access restriction ticket. If signature verification is successful, the printing apparatus 103 prints in step S414.

In the first embodiment, the authentication server 102 encrypts access restriction information with a private key (encryption information) held in it, and the printing apparatus 103 decrypts the access restriction information with a public key (decryption information). However, this cryptography is an application example. For example, the authentication server 102 may encrypt access restriction information with private keys corresponding to a plurality of printing apparatuses, and each printing apparatus may decrypt the access restriction information with a public key held in it. Encryption information and decryption information to perform encryption and decryption of another type are also applicable without using either the public key or private key. For descriptive convenience, the private key and public key will be exemplified as encryption information and decryption information, respectively.

Information contained in an access restriction ticket will be explained with reference to FIG. 5. FIG. 5 is a table showing information associated with access restriction information held in the authentication server according to the first embodiment. The access restriction ticket is issued in response to authentication information formed from a user name and password. For example, the access restriction ticket contains access restriction information such as the number of printable sheets, page layout, and color setting.

The authentication server 102 holds information of a user name 501, password 502, maximum sheet count 503, actual sheet count 504, and print restriction 505. The user name 501 is a unique ID assigned to a user who can access the printing system. The password 502 is set for each user. The maximum sheet count 503 represents the maximum number of print sheets available per month by the user. The actual sheet count 504 represents the number of sheets actually printed the current month by the user. The print restriction 505 represents print conditions restricted for each user. The print conditions are restrictions on print setting such as monochrome/color printing and single/double-sided printing. The administrator of the printing system according to the first embodiment can restrict the print conditions to only double-sided printing and monochrome printing for cost reduction.

The password 502 is a plaintext password as shown in FIG. 5, but it is desirable to store only a one-way hash value of the plaintext to prevent password leakage for security. In authentication, for example, the hash value is compared with the hash value of an input password. However, the mechanism of the password is apart from the spirit of the present invention, and details thereof will be omitted. The database in the present invention is readable/writable with only administrative right to protect security.

The following description is based on a row 511. The user name 501 shows a user entry "User 1", and the password 502 shows a character string "Akd5sj4f". The maximum sheet count 503 is 500, which means that the number of print sheets per month by User 1 is restricted to 500. The actual sheet count 504 is 123, which means that User 1 has already printed 123 sheets in the current month.

Similarly, a row 512 defines pieces of information on User 2, a row 513 defines pieces of information on User 3, and a row 514 defines pieces of information on a guest user. No password 502 is set for the guest user, but the maximum sheet count is 0, so the guest user cannot print. Whether to set a guest user depends on the system policy. A guest user may or may not be set.

To log onto the host computer 101, the user inputs the user name 501 and password 502. The authentication server 102 receives the input authentication information, and collates the input user name 501 and password 502 with a user name 501 and password 502 held in the authentication server 102. If authentication is successful, the authentication server 102 notifies the host computer 101 of an access restriction ticket containing the maximum sheet count 503 and actual sheet count 504. For example, when the user is User 1, the authentication server 102 returns an access restriction ticket containing the maximum sheet count=500, the actual sheet count=123, and print conditions=monochrome printing and double-sided printing. The access restriction ticket has the above-described information (access control list).

When notified of the access restriction ticket, the host computer 101 recognizes that 500−123=377 sheets are printable, in consideration of the maximum sheet count=500 and the actual sheet count=123 in the access control list. When the number of sheets of a print job is equal to or smaller than 377, the host computer 101 executes printing. When the number of sheets of a print job is equal to or larger than 378, the host computer 101 generates a warning that the number of sheets of a print job exceeds the printable sheet count, and prompts the user to perform an operation.

<Print Instruction User Interface from Host Computer>

Figure 6:
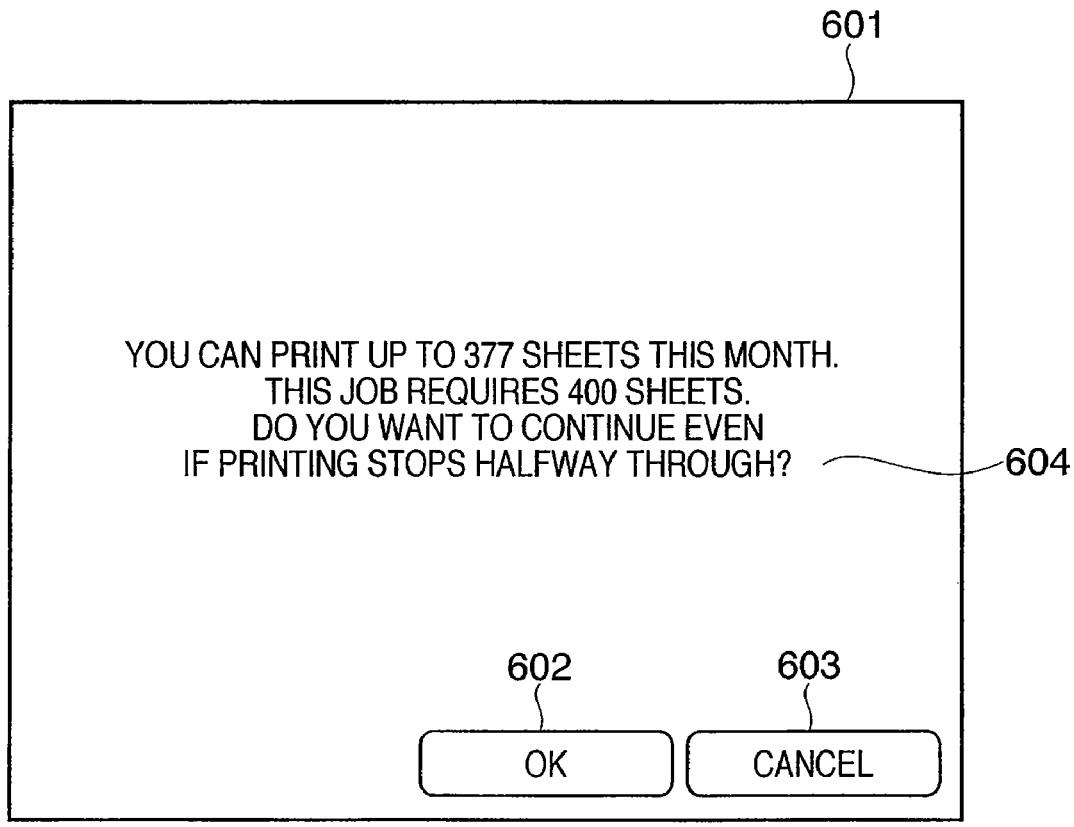
FIG. 6 is a view showing a dialog GUI associated with a print instruction output from a host computer according to the first embodiment.

A print instruction from the host computer 101 to the user will be described with reference to FIG. 6. FIG. 6 is a view showing a dialog GUI associated with a print instruction output from the host computer according to the first embodiment. A dialog 601 includes a print button 602 to execute printing, and a cancel button 603 to cancel printing. When the print job exceeds the printable count, a display 604 displays a warning that printing will fail.

If the user presses the print button 602, the host computer 101 decreases the number of output sheets of a print job to 377, and then prints. Hence, the remaining 23 sheets are not printed, and the user cannot obtain a desired print result. If the user presses the cancel button 603, the host computer 101 discards the print request itself and cancels printing.

<Functional Block Diagram of Printing Apparatus>

Figure 7:
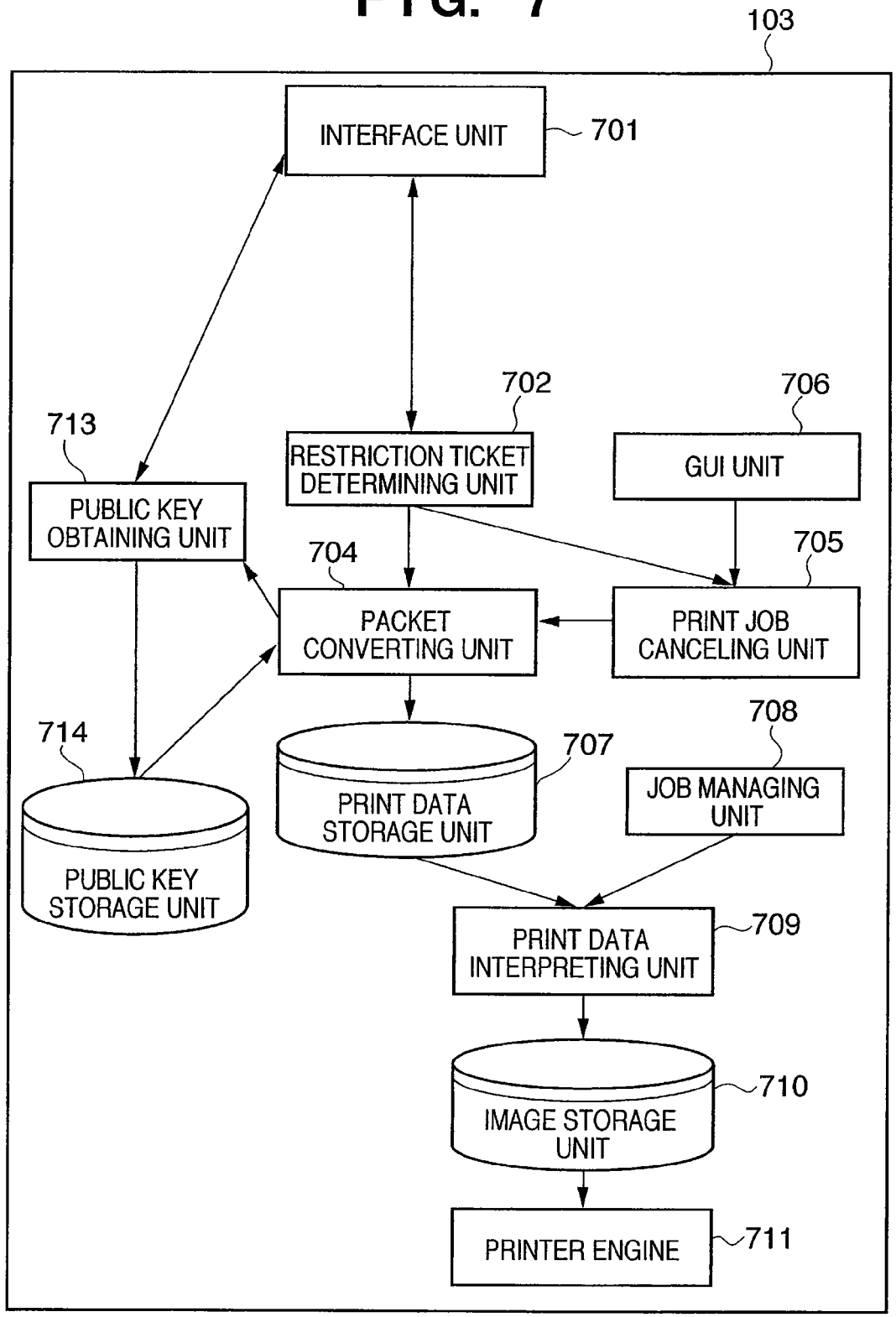
FIG. 7 is a block diagram showing an example of the detailed functional arrangement of the printing apparatus according to the first embodiment.

Control of the printing apparatus 103 will be explained for each functional block with reference to FIG. 7. FIG. 7 is a block diagram showing an example of the detailed functional arrangement of the printing apparatus according to the first embodiment. Each block shown in FIG. 7 is implemented by hardware, software, or a combination of them.

The printing apparatus 103 comprises an interface unit 701, restriction ticket determining unit 702, packet converting unit 704, print data storage unit 707, public key obtaining unit 713, public key storage unit 714, GUI unit 706, and print job canceling unit 705. Further, the printing apparatus 103 comprises a job managing unit 708, print data interpreting unit 709, image storage unit 710, and printer engine 711.

The interface unit 701 connects to the network 107 to receive a print job from the host computer 101. The restriction ticket determining unit 702 checks the type of received print job, and determines whether an access restriction ticket is added. The public key storage unit 714 functions as a holding means for storing public keys obtained from one or more authentication servers. The public key obtaining unit 713 obtains a unique public key from the authentication server via the interface unit 701.

When an access restriction ticket is added, the packet converting unit 704 verifies a signature and reduces an instruction to the print job based on the restriction information, and notifies the print job canceling unit 705 of the resultant print job. The print job canceling unit 705 designates cancellation of printing for a print job having no access restriction ticket. The print data storage unit 707 temporarily stores print data, that is, PDL (Page Description Language) data contained in a print job. The job managing unit 708 temporarily stores output attribute information such as the number of pages and the color to be printed by a print job. The print data interpreting unit 709 generates image data to be printed by performing an image generation process in accordance with attribute information stored in the job managing unit 708 and print data obtained from the print data storage unit 707. The image storage unit 710 temporarily stores image data generated by the print data interpreting unit 709 until the completion of printing. The printer engine 711 actually prints image data stored in the image storage unit 710 on a medium such as a print sheet by a known printing technique such as electrophotography or inkjet printing. The print data storage unit 707 and image storage unit 710 may be formed from secondary storage devices such as a large-capacity hard disk, but the present invention does not limit the physical arrangement.

<Print Job Format>

Figure 8:
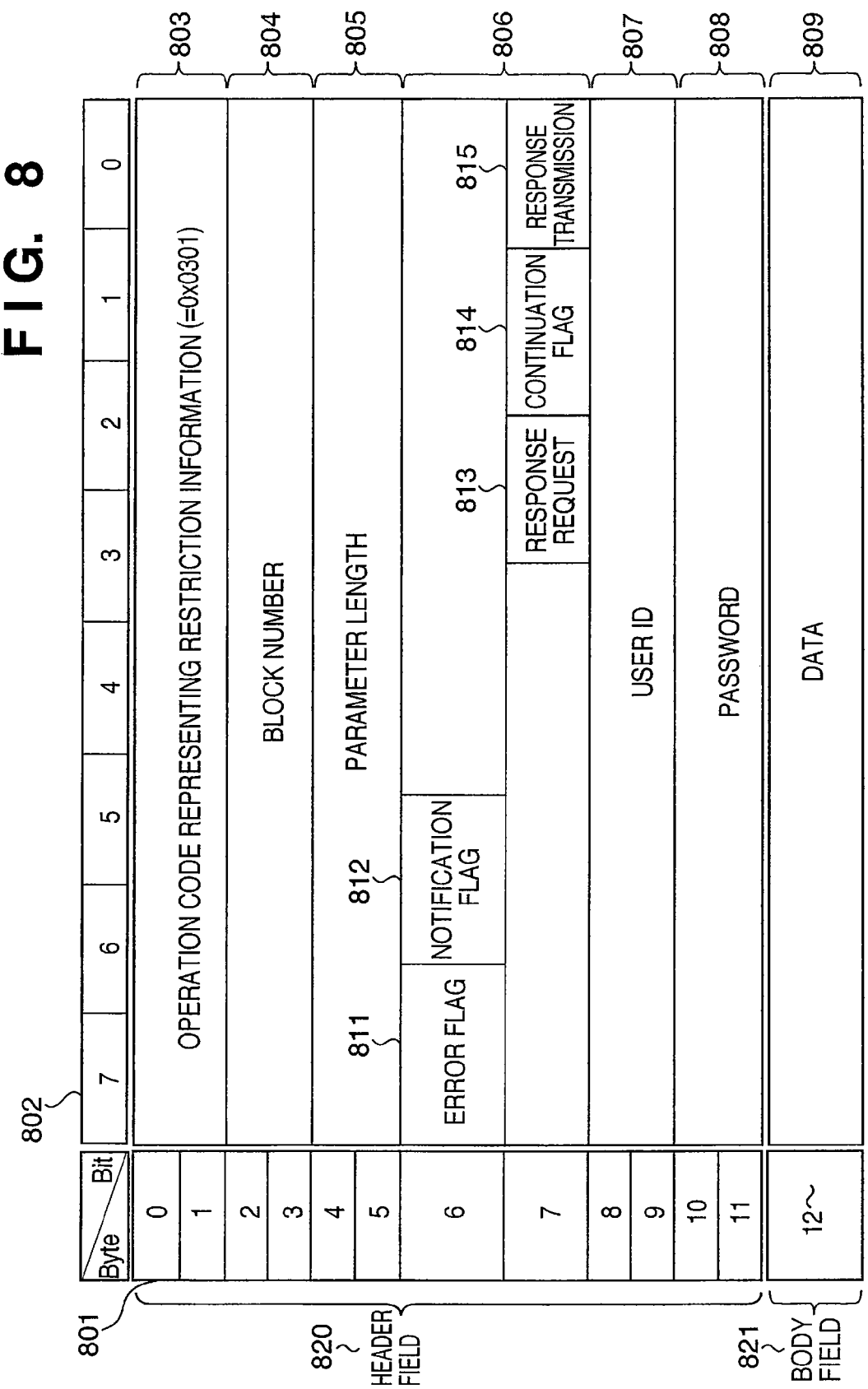
FIG. 8 is a view showing the structure of a job packet according to the first embodiment.

The format of a job packet contained in a print job will be described with reference to FIG. 8. The print job is formed from one or more job packets standardized to easily recognize the start and end of the print job and set the attribute of the print job. FIG. 8 is a view showing the structure of a job packet according to the first embodiment. An ordinate axis 801 represents bytes, and an abscissa axis 802 represents the bits of each byte. A permanent area of the 0th to 11th bytes forms a header field 820, and a data field 809 of the 12th and subsequent bytes is a variable area and forms a body field 821.

An operation code 803 of the 0th and 1st bytes is a 2-byte ID representing a packet function.

| | |
|---|---|
| 0x0201 | job start operation |
| 0x0202 | job attribute setting operation |
| 0x0204 | PDL data transmission operation |
| 0x0205 | job end operation |
| 0x0301 | restriction information operation |

The job packet can set the above packet functions.

A block number 804 of the second and third bytes is used to determine the correspondence between a response from the receiving side and a response request from the transmitting side when the receiving side issues a response upon reception of a job packet. Assume that the transmitting side sequentially transmits job packets whose block numbers 804 are 1, 2, and 3. When the receiving-side sends back an error packet of a block number 804 "2", the transmitting side can specify that an error occurred in the second transmitted job packet, and transmit the job packet again.

A parameter length 805 of the fourth and fifth bytes represents the byte length of the data field 809, and can indicate 0 to 64 Kbytes. The sixth and seventh bytes store various flags 806 of the job packet, and represent the following contents.

A value "1" of an error flag 811 means that an error occurred in the printing apparatus 103. The error flag 811 is added to a reply packet transmitted from the printing apparatus 103 to the host computer 101. A value "1" of a notification flag 812 means that the packet is not a response to a request packet from the host computer 101, but the printing apparatus 103 notifies the host computer 101 of any notification matter.

A response request 813 is set to "1" when the host computer 101 requests a response packet of the printing apparatus 103. A value "0" of the response request 813 means that no response is necessary when a sent packet is normally processed. If an error occurs in the printing apparatus 103, a response packet with an error flag "1" is always sent regardless of whether the response request is "0" or "1". A value "1" of a continuation flag 814 means that all data cannot be set in the data field 809 and are divided and the remaining data are sent by the next job packet. In this case, the next job packet has the same operation code as that of the preceding packet. Response transmission 815 represents that this transmission is a response to some transmission or a new transmission. For example, when the response transmission 815 is set to "1", this may mean that the transmission is a response to some transmission.

A user ID 807 of the 8th and 9th bytes and a password 808 of the 10th and 11th bytes are used for authentication when imposing security restriction on an operation executable by a sent packet. The user ID 807 and password 808 need not be used in the first embodiment.

The data field 809 of the 12th and subsequent bytes store data corresponding to the operation code. For a job start operation and job end operation, the data field 809 does not store any data.

For a job attribute setting operation, the data field 809 stores a job attribute ID and job attribute value to be set. The job attribute ID is an identifier corresponding to an attribute or environment associated with a job. An ID corresponding to a job attribute defined by ISO-10175 (DPA) (ISO: International Organization for Standardization) is assigned in advance. Typical job attribute IDs are as follows:

| | |
|---|---|
| 0x0101 | job name |
| 0x0103 | job owner name |
| 0x016a | job size |
| 0x0174 | the number of print pages |

In addition, a job attribute such as the number of copies or monochrome/color and a corresponding ID can be assigned in accordance with the function of the printing apparatus 103.

<Print Job without Function Restriction Information>

Figure 9:
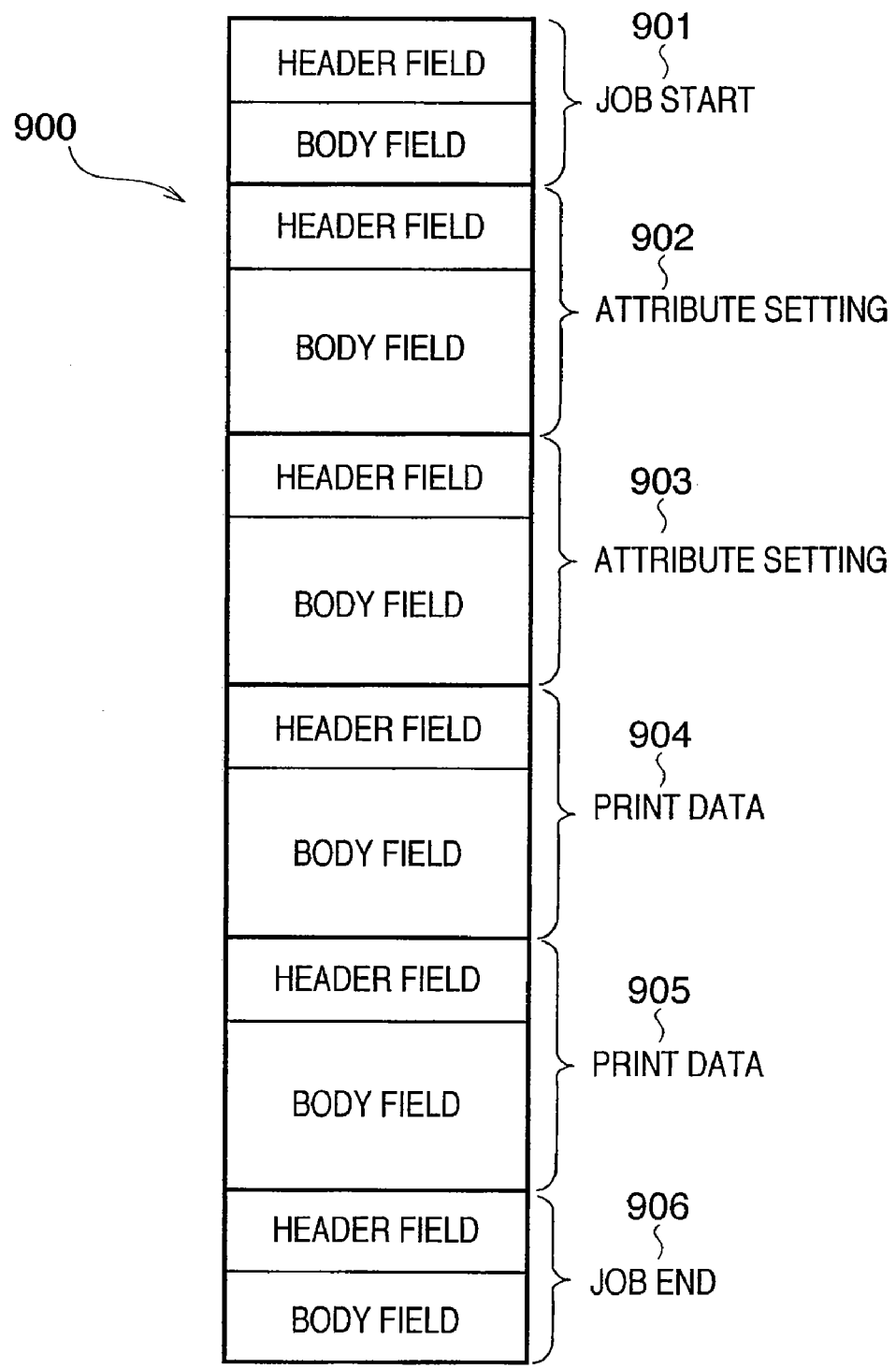
FIG. 9 is a view showing the structure of a conventional print job.

The contents of a conventional print job will be explained with reference to FIG. 9. FIG. 9 is a view showing the structure of a conventional print job. The host computer 101 transmits job packets to the printing apparatus 103 sequentially from an upper job packet to a lower one. The header field of one packet corresponds to the header field 820 of the 0th to 11th bytes in FIG. 8, and the body field 821 corresponds to the data field 809 of the 12th and subsequent bytes.

A print job 900 contains job packets of a job start 901, attribute settings 902 and 903, print data 904 and 905, and a job end 906. The print job 900 is an application example, and does not limit the structure of the print job.

The job start 901 is formed from a job packet which declares the start of the print job. It is determined that a job packet is the job start 901 when the operation code 803 is "0x0201" representing a job start operation. The attribute settings 902 and 903 set the job name, owner name, print conditions, and the like of the print job. It is determined that job packets are the attribute settings 902 and 903 when the operation code 803 is "0x0202" representing an attribute setting operation. When setting a plurality of attributes, the host computer 101 generates a plurality of attribute settings 902 and 903 and transmits them to the printing apparatus 103.

The print data 904 and 905 contain image data to be formed on a medium such as a paper sheet. It is determined that job packets are the print data 904 and 905 when the operation code 803 is "0x0204" representing a PDL data transmission operation. Similar to the attribute settings 902 and 903, the host computer 101 may generate a plurality of print data 904 and 905 and transmit them to the printing apparatus 103. The last part of the print job 900 is formed from a job packet representing the job end 906. It is determined that a job packet is the job end 906 when the operation code 803 is "0x0205" representing a job end operation. Upon reception of the job end 906, the printing apparatus 103 recognizes that the print job 900 ends.

<Print Job with Function Restriction Information>

Figure 10:
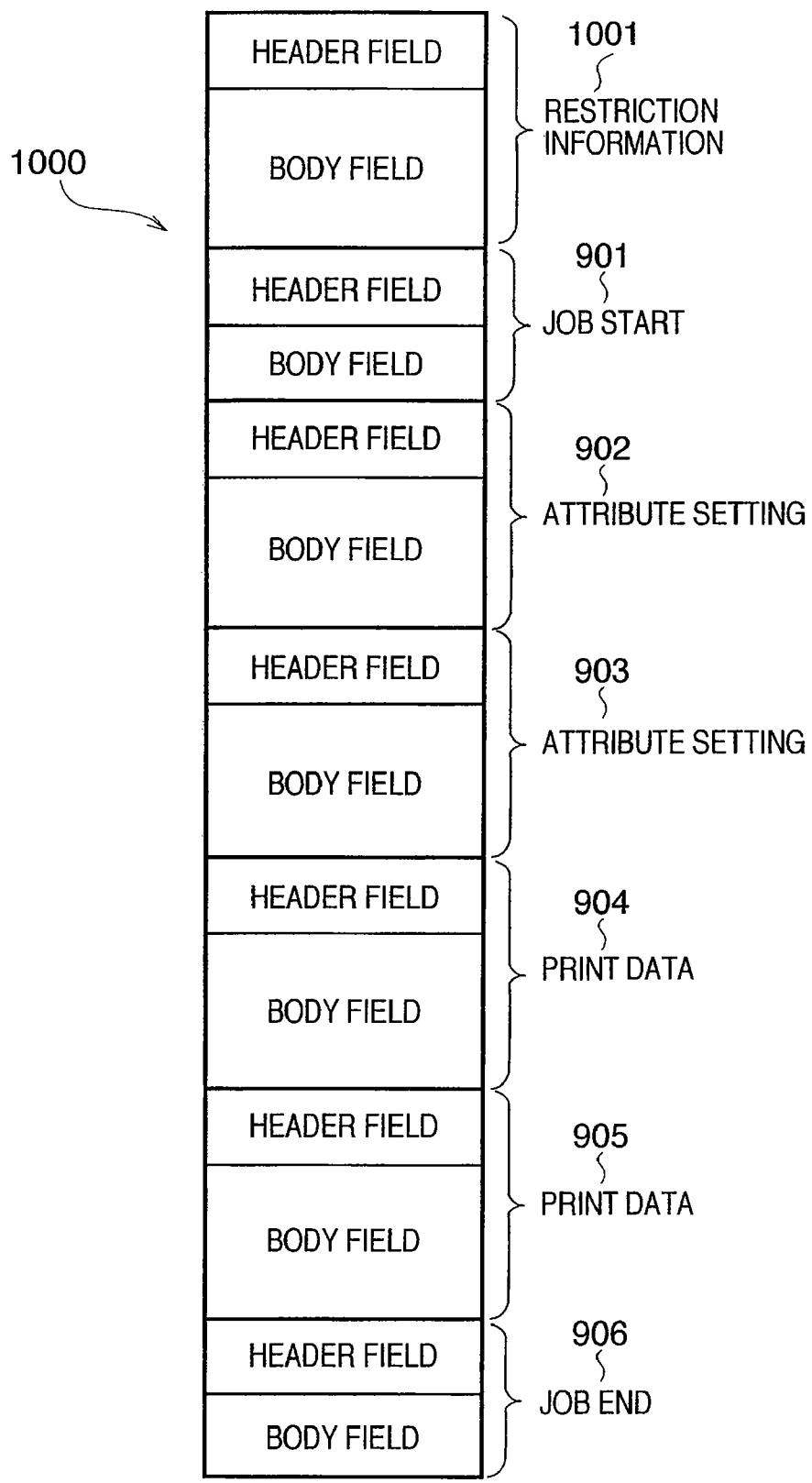
FIG. 10 is a view showing the structure of a print job according to the first embodiment.

The contents of a print job according to the first embodiment and restriction information in an access restriction ticket will be explained with reference to FIGS. 10 and 11. FIG. 10 is a view showing the structure of a print job according to the first embodiment. To avoid a repetitive description, only the difference from the conventional print job shown in FIG. 9 will be explained.

A print job 1000 further contains a job packet representing restriction information 1001 at the start. It is determined that a job packet is the restriction information 1001 when the operation code 803 is "0x0301" representing a restriction information operation. A restriction information operation-designated job packet describes an access restriction ticket in the data field.

FIG. 11 is a view showing an example of the format of restriction information contained in the access restriction ticket according to the first embodiment. A character string "MAX_PRINT" represents the upper limit number of sheets outputtable by a print job, and "=100" shows the setting of the value. The upper limit number of sheets printable by the print job is 100.

A character string "STRICT_DUPLEX" represents whether to force double-sided printing, and "=TRUE" means forcedly executing double-sided printing. "STRICT_Nin1" decides how many logical pages are to be laid out on one sheet surface (i.e., Nin1 or Nup function), and "=2" means forcedly executing 2in1. "STRICT_MONOCOLOR" represents whether to restrict printing to monochrome printing in a printing apparatus having the color print function, and "=TRUE" means forcedly printing in monochrome.

These settings lead to reduced consumption of coloring materials such as toner and ink, and are effective for TCO reduction. The printing apparatus 103 executes digital signature-based verification to verify that an authentic authentication server has issued an access restriction ticket.

<Format Structure of Access Control Ticket (Access Restriction Ticket)>

Figure 12:
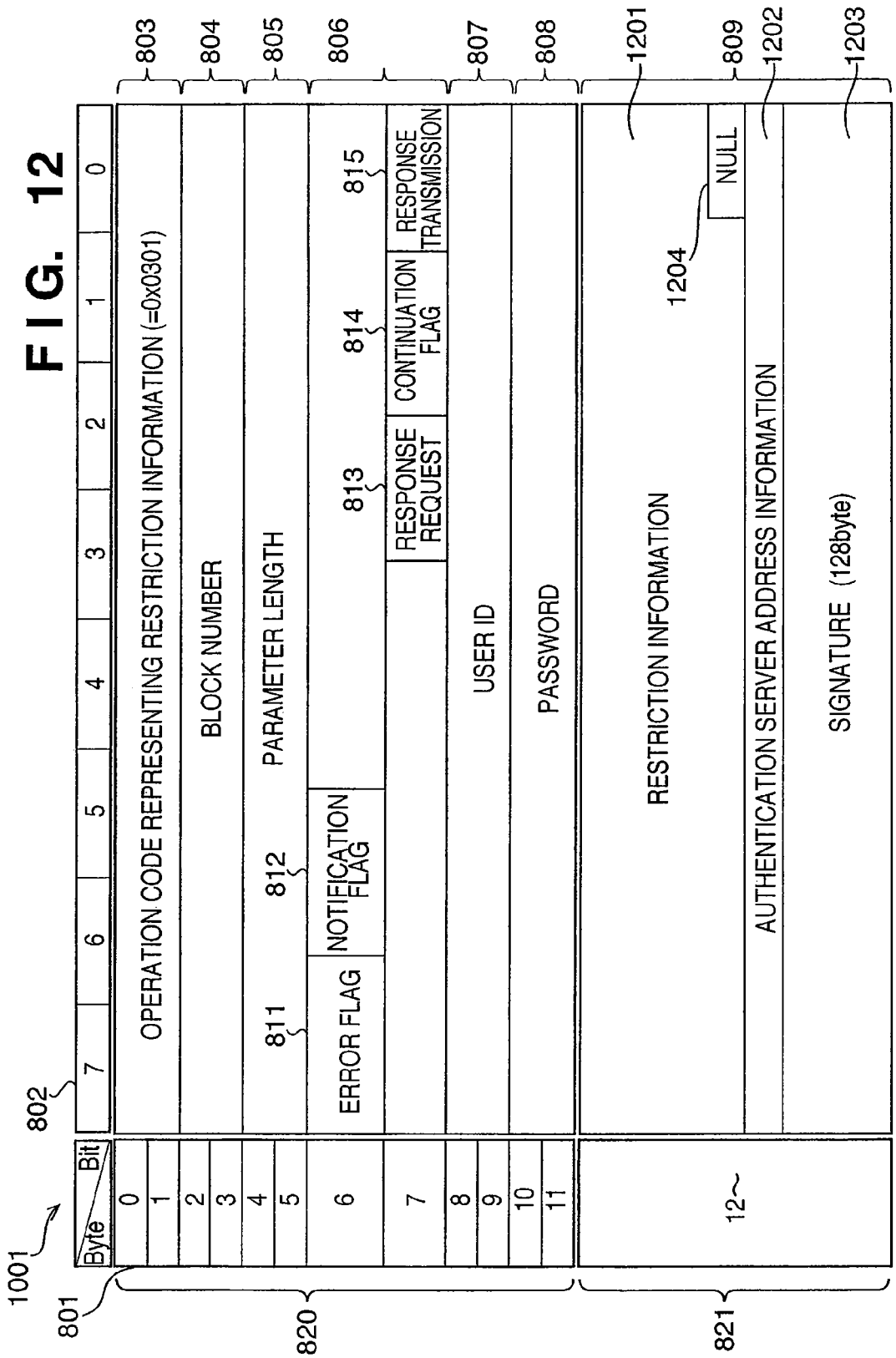
FIG. 12 is a view showing the job packet of the access restriction ticket according to the first embodiment.

The structure of a job packet which forms the restriction information 1001 will be explained with reference to FIG. 12. FIG. 12 is a view showing the job packet of the access restriction ticket according to the first embodiment. To avoid a repetitive description, a description of the same fields as those in FIG. 8 will be omitted.

The job packet of the restriction information 1001 contains the header field 820 of the 0th to 11th bytes, and the body field 821 serving as the data area of the 12th and subsequent bytes. The body field 821 contains restriction information 1201, authentication server address information 1202, and a signature 1203.

The restriction information 1201 has an area from the start to a NULL character 1204. The restriction information 1201 has information described with reference to FIG. 5. The authentication server address information 1202 has a key for determining whether a public key corresponding to the authentication server is held, and when no corresponding public key is held, the address of the authentication server from which the public key is obtained. The signature 1203 serving as a 128-byte digital signature is set in an area after the authentication server address information 1202. The signature 1203 guarantees that the restriction information 1001 has been issued from the authentic authentication server 102 or 105 and has not been rewritten by an illicit means en route. The authentication server address information 1202 describes whether the authentication server is the authentication server 102 or 105.

The signature 1203 generally complies with a scheme using, for example, RSA (Rivest Shamir Adleman) public key cryptography. For a digital signature based on the public key cryptography, a digest is generated by a one-way function from a signature target (in this case, the restriction information 1201). The digital signature is encrypted with a private key held in the digest issuing source (in this case, the authentication server 102 or 105). The printing apparatus 103 verifies the signature using the public key. The private key is held in only an authentic authentication server. If signature verification using a correct public key is successful, it can be proved that the signature target is authentic. The public key used for the digital signature is that of a public key pair held in the authentication server 102 or 105. Prior to printing, the authentication server 102 or 105 transfers the public key to the printing apparatus 103. Once the printing apparatus 103 obtains the public key from the authentication server, it holds the obtained public key in the public key storage unit 714. As described above, the authentication server 102 or 105 may encrypt access restriction information with private keys corresponding to a plurality of printing apparatuses, and the printing apparatus 103 may decrypt the access restriction information with a public key held in it.

Figure 13:
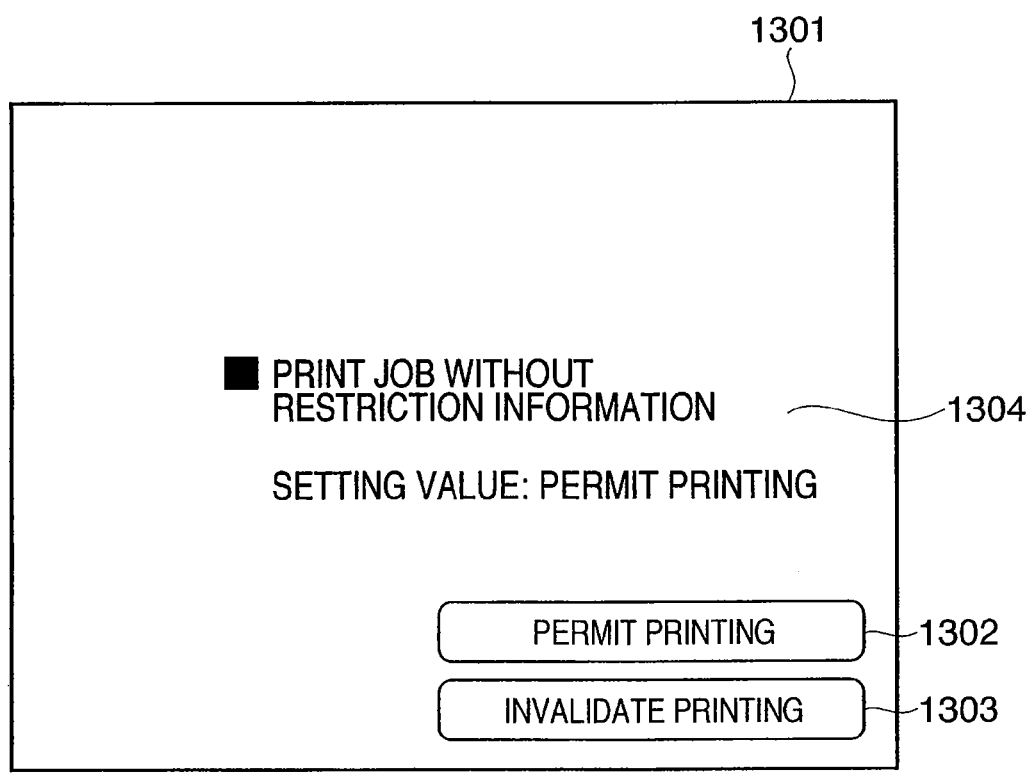
FIG. 13 is a view showing a dialog GUI associated with a print instruction output from the host computer according to the first embodiment.

The operation setting of the printing apparatus 103 when accepting a print job containing no restriction information 1101 will be explained with reference to FIG. 13. FIG. 13 is a view showing an example of a window displayed on the touch panel of the operation unit 321 of the printing apparatus 103 according to the first embodiment. The administrator of the printing apparatus 103 can use a window as shown in FIG. 13 to set in advance whether the printing apparatus 103 executes a print job when a job packet at the start of the print job does not have the restriction information 1101.

A dialog 1301 contains a print permission button 1302 to permit printing, and a print invalidation button 1303 to invalidate printing. A display 1304 shows the current setting value.

When the administrator operates the print permission button 1302, the printing apparatus 103 is set to execute printing even for a print job containing no restriction information 1101. In this case, the RAM 319 of the printing apparatus 103 stores a corresponding setting value. After making this setting, the printing apparatus 103 prints even when the print job does not have restriction information 1101. However, considering the cost of consumables and the like, it is desirable to always invalidate this setting. In FIG. 13, it is uniformly set to permit or invalidate printing, but it may also be set for each user to permit or invalidate printing. When the administrator operates the print invalidation button 1303, the printing apparatus 103 is set not to print by invalidating a print job containing no restriction information 1101. In this case, the RAM 319 of the printing apparatus 103 stores a corresponding setting value.

<Print Job Reception Process>

Figure 14:
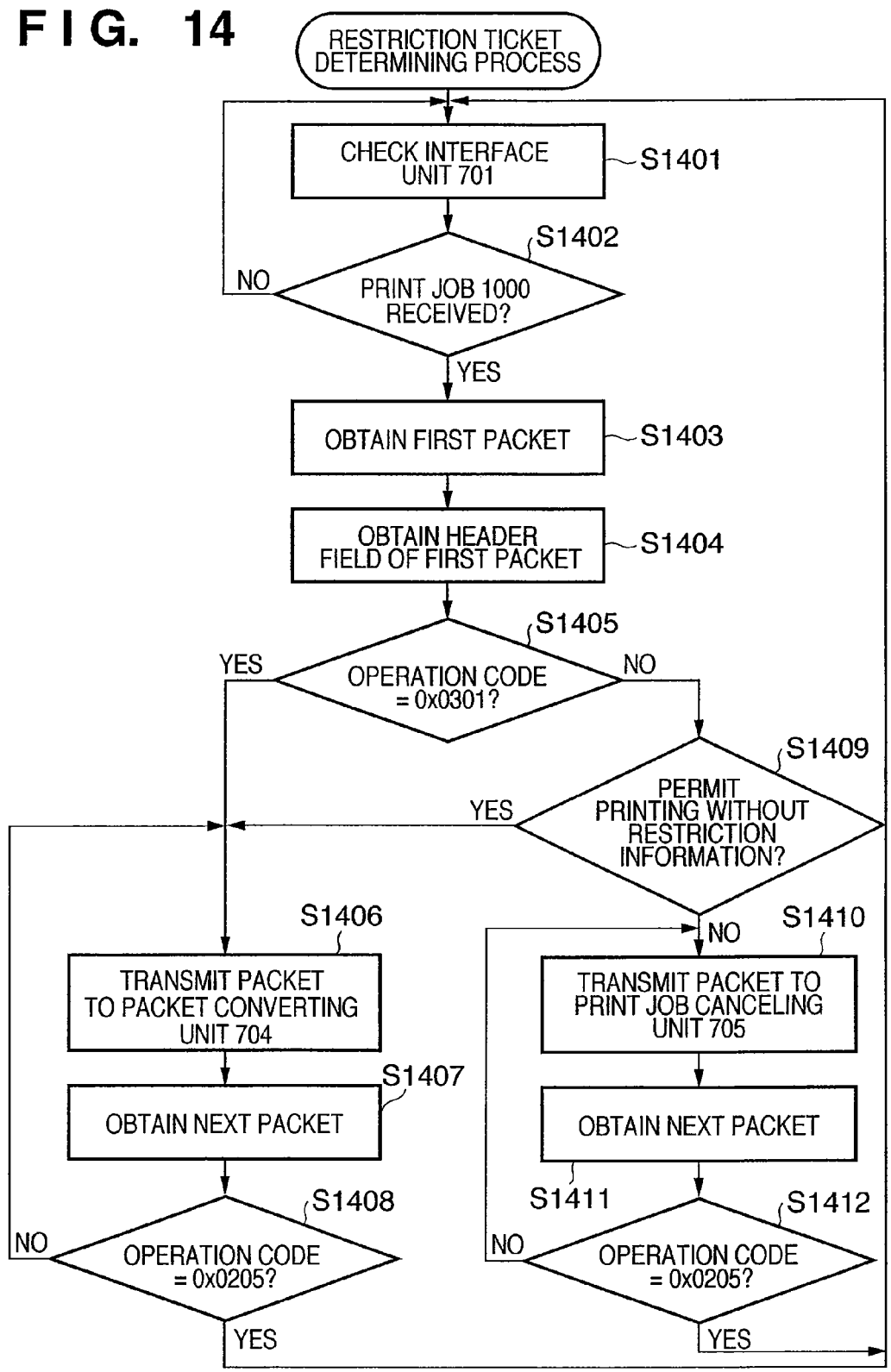
FIG. 14 is a flowchart for explaining the operation of a restriction ticket determining unit according to the first embodiment.

Control of the restriction ticket determining unit 702 in the printing apparatus 103 will be described with reference to FIG. 14. FIG. 14 is a flowchart for explaining the operation of the restriction ticket determining unit according to the first embodiment. The restriction ticket determining unit 702 starts operating at the same time as activation of the printing apparatus 103, and keeps operating until power-off of the printing apparatus 103.

In step S1401, the restriction ticket determining unit 702 checks the interface unit 701. This process checks whether the interface unit 701 has received the job packet of a print job. If the restriction ticket determining unit 702 determines in step S1402 that the interface unit 701 has not received a print job in S1401, it shifts the process to S1401 again. If the interface unit 701 has received a print job, the restriction ticket determining unit 702 shifts the process to S1403.

In step S1403, the restriction ticket determining unit 702 obtains one first (start) job packet in the print job from the interface unit 701. In step S1404, the restriction ticket determining unit 702 extracts the operation code of the header field from the obtained job packet. In step S1405, the restriction ticket determining unit 702 detects the presence/absence of an access restriction ticket. More specifically, the restriction ticket determining unit 702 determines whether the operation code is 0x0301 representing a restriction information operation.

If the restriction ticket determining unit 702 determines in S1405 that the operation code represents the restriction information operation, it transmits the obtained job packet to the packet converting unit 704 in step S1406. In step S1407, the restriction ticket determining unit 702 obtains the next job packet from the interface unit 701. After obtaining the next job packet, the restriction ticket determining unit 702 determines in step S1408 whether the operation code is 0x0205 representing the end of the job. If the restriction ticket determining unit 702 determines that the operation code represents the job end operation, it shifts the process to S1401 to wait for transmission of the next print job. If the restriction ticket determining unit 702 determines that the operation code does not represent the job end operation, it shifts the process to S1406 to transmit the obtained job packet to the packet converting unit 704.

If the restriction ticket determining unit 702 determines in S1405 that the operation code is not the restriction information operation code, it determines in step S1409 whether to permit printing even a print job having no restriction information. This determination is based on contents set in advance using the window in FIG. 13. More specifically, when the print permission button 1302 "permit printing" is set in the setup window of FIG. 13, the restriction ticket determining unit 702 determines to permit printing ("YES" in step S1409). If the print invalidation button 1303 "invalid printing" is set, the restriction ticket determining unit 702 determines to invalidate printing ("NO" in step S1409). If printing is permitted in step S1409, the restriction ticket determining unit 702 shifts the process to step S1406. If printing is not permitted, the restriction ticket determining unit 702 shifts the process to step S1410 to discard the job packet of the print job. In step S1410, the restriction ticket determining unit 702 recognizes that the print job is invalid, and transmits the packet to the print job canceling unit 705.

In step S1411, the restriction ticket determining unit 702 obtains the next job packet. In step S1412, the restriction ticket determining unit 702 determines whether the operation code is 0x0205 representing the end of the job. If the restriction ticket determining unit 702 determines that the operation code represents the job end operation, the restriction ticket determining unit 702 shifts the process to S1401 to wait for transmission of the next print job. If the restriction ticket determining unit 702 determines that the operation code does not represent the job end operation, the restriction ticket determining unit 702 shifts the process to S1409 to repeat the above process until all job packets in the unauthentic print job are discarded.

<Description of Operation of Packet Converting Unit 704>

Figure 15:
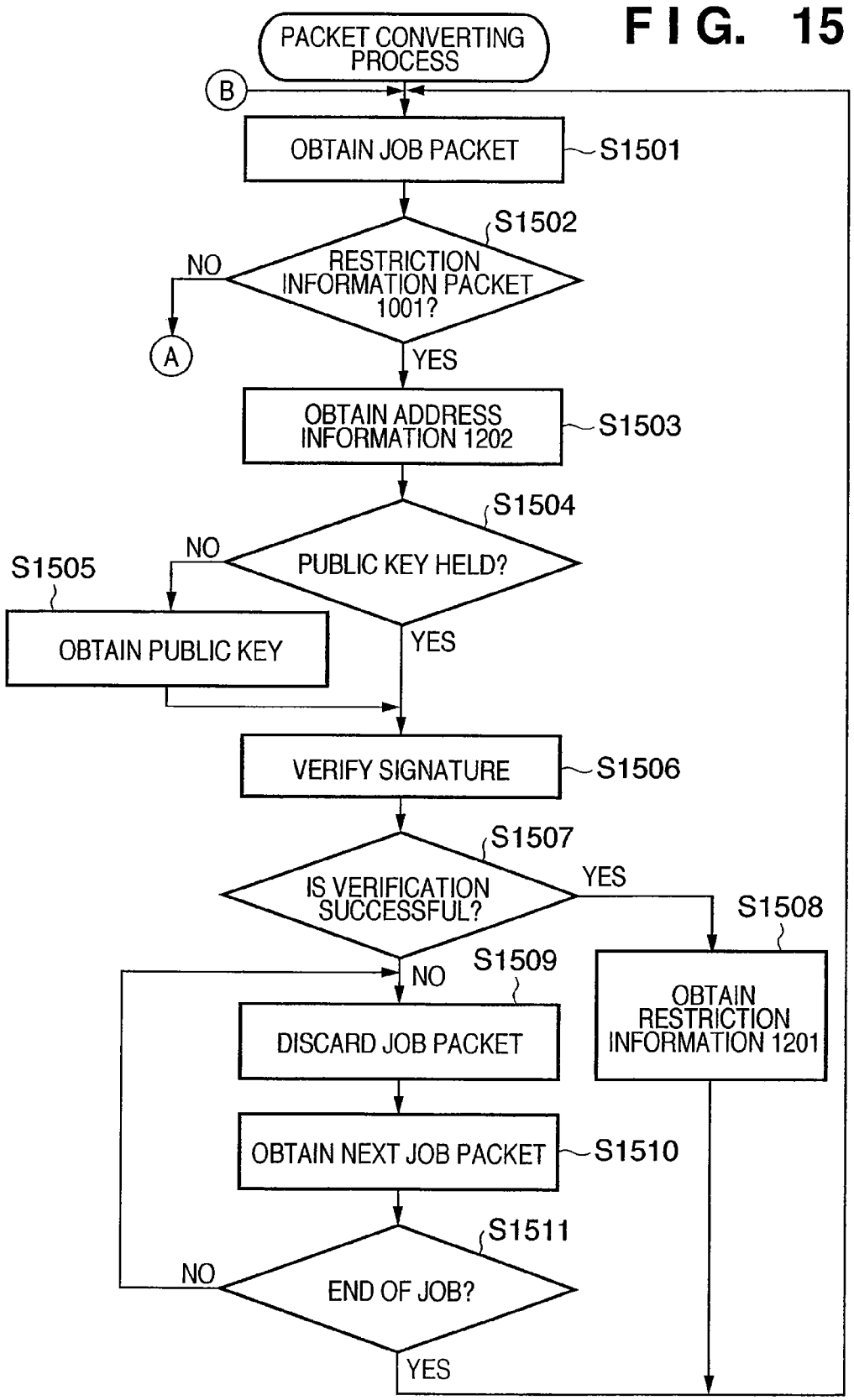
FIG. 15 is a flowchart showing the operation of a packet converting unit according to the first embodiment.
Figure 16:
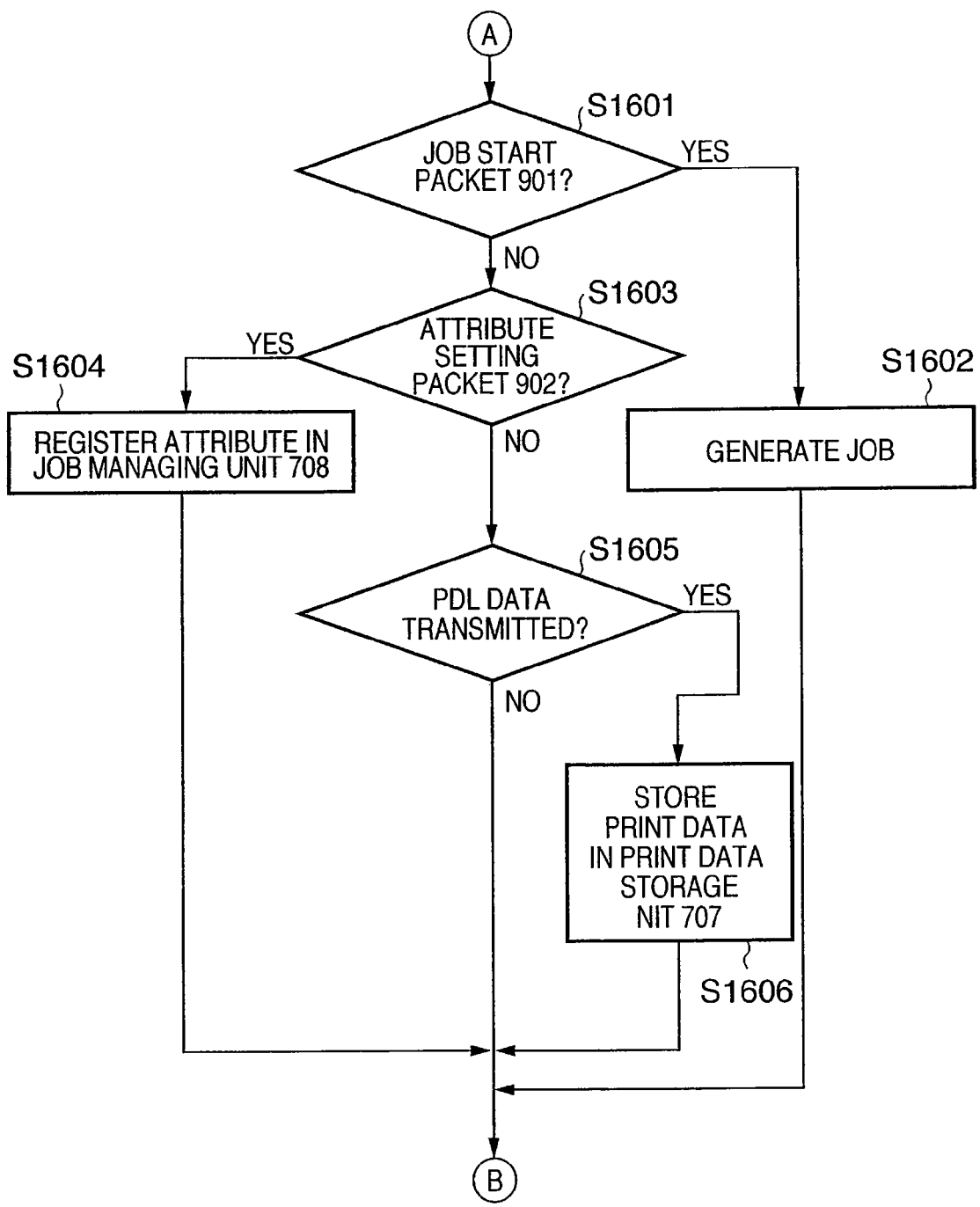
FIG. 16 is a flowchart showing the operation of the packet converting unit according to the first embodiment.

The operation of the packet converting unit 704 will be described with reference to FIGS. 15 and 16. FIGS. 15 and 16 are flowcharts showing the operation of a packet converting process by the packet converting unit according to the first embodiment. The packet converting unit 704 starts operating at the same time as activation of the printing apparatus 103, and keeps operating till power-off of the printing apparatus 103.

In step S1501, the packet converting unit 704 obtains one job packet from the restriction ticket determining unit 702. After obtaining the job packet, the packet converting unit 704 detects the presence/absence of an access restriction ticket in step S1502. More specifically, the packet converting unit 704 checks the operation code area to determine whether the operation code is 0x0301 representing restriction information. If the job packet represents the restriction information 1001, the packet converting unit 704 shifts the process to S1503. If the job packet represents information other than the restriction information 1001, the packet converting unit 704 shifts the process to S1601 shown in FIG. 16. FIG. 16 shows the process of a job execution controlling unit which controls execution of a print job input when a verifying unit verifies that input data is authentic.

If the job packet has the restriction information 1001, the packet converting unit 704 extracts the authentication server address information 1202 from the access restriction ticket in step S1503. As described with reference to FIG. 12, the authentication server address information stores the address (identifier) of an authentication server which has issued the access restriction ticket. In step S1504, the packet converting unit 704 confirms, based on information held in the public key storage unit 714, whether the printing apparatus 103 has already obtained a public key corresponding to the authentication server 102. If the printing apparatus 103 has not already obtained the public key, the packet converting unit 704 requests the public key obtaining unit 713 to obtain the public key, thereby obtaining the public key from the authentication server 102 in step S1505. Then, the packet converting unit 704 shifts the process to S1506. The method of obtaining a public key as decryption information in S1505 is basically the same as that in step S411 described above. That is, the public key serving as decryption information is obtained via the network in accordance with authentication server address information contained in or added to the access restriction ticket. However, the public key obtaining method is not limited to this. For example, when a MAC address or authentication server name is applied to an assigned authentication server identifier, an authentication server address is obtained from a DNS server or the like using the MAC address or authentication server name. The public key serving as decryption information may also be obtained in accordance with the obtained address. That is, obtainment of decryption information (e.g., public key) corresponding to an authentication server identifier contained in access restriction information is a characteristic operation.

If the printing apparatus 103 has already obtained the public key or obtains it, the packet converting unit 704 verifies the signature 1203 using the obtained public key in step S1506. The packet converting unit 704 determines in step S1507 whether the verification is successful. If the verification is successful, the packet converting unit obtains the restriction information 1201, stores it in a predetermined storage unit in step. S1508, and returns to step S1501. If the verification fails, the packet converting unit 704 discards the job packet in step S1509, and obtains the next job packet in step S1510. In step S1511, the packet converting unit 704 determines whether the operation code of the obtained job packet represents the end of the job. If the operation code represents the end of the job, the packet converting unit 704 shifts the process to S1501. If the operation code does not represent the end of the job, the packet converting unit 704 returns the process to S1509 to discard the job packet. If verification fails, the job is discarded until the end of the print job.

If the packet converting unit 704 determines in S1502 that the job packet does not represent restriction information, the packet converting unit 704 performs a general job packet interpreting process. In step S1601 of FIG. 16, the packet converting unit 704 determines whether the operation code represents the start of the job. If the operation code represents the start of the job, the packet converting unit 704 allocates a print job area in the job managing unit 708, and assigns a job identifier to generate a new job in step S1602. If the packet converting unit 704 determines in S1601 that the operation code represents an operation other than the start of the job, it determines in step S1603 whether the operation code represents attribute setting. If the operation code represents attribute setting, the packet converting unit 704 sets an attribute value in the print job attribute area in the job managing unit 708 in step S1604. If the operation code represents PDL data transmission in step S1605, the packet converting unit 704 stores print data in the print data storage unit 707. After that, the packet converting unit 704 shifts the process to S1501 regardless of whether the operation code represents the start of the job, attribute setting, or data transmission.

<Description of Operation of Print Data Interpreting Unit 709>

Figure 17:
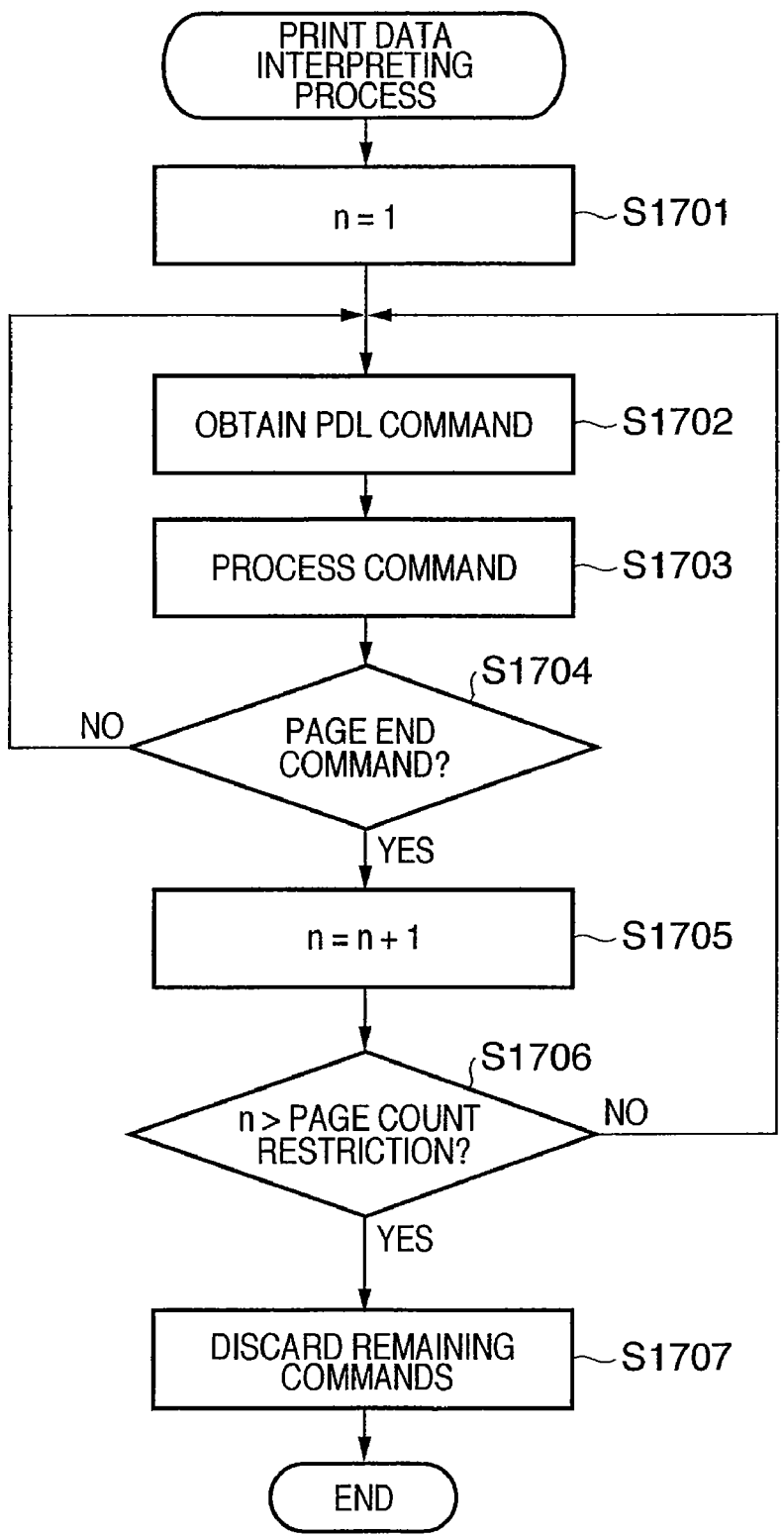
FIG. 17 is a flowchart for explaining the operation of a print data interpreting unit according to the first embodiment.

The operation of a print data interpreting process by the print data interpreting unit 709 based on restriction information will be described with reference to FIG. 17. The process in FIG. 17 functions as a job execution means for processing a print job. FIG. 17 is a flowchart for explaining the process operation of the print data interpreting unit 709 according to the first embodiment. The print data interpreting unit 709 interprets PDL (Page Description Language) set in the data field 809 of a job packet of a PDL data transmission operation, and generates image data used for actual printing. The PDL has various standards such as PostScript and LIPS. The print data interpreting unit 709 continues the process until it receives a print job and finishes interpreting the final page of the print job.

In step S1701, the print data interpreting unit 709 initializes the variable n representing the number of pages to 1. The variable n is used to count the number of pages to be printed upon reception of all job packets. In step S1702, the print data interpreting unit 709 obtains a PDL command from the print data storage unit 707. After obtaining the PDL command, the print data interpreting unit 709 interprets the PDL command in step S1703. The PDL command is assumed to be, for example, a command for actual drawing such as "rectangle drawing" or "image drawing" in the LIPS language.

In step S1704, the print data interpreting unit 709 determines whether the command processed in S1703 is a page end command. If the command is not the page end command, the print data interpreting unit 709 shifts the process to S1702. If the command is the page end command, the print data interpreting unit 709 increments by one the variable n representing the number of pages in step S1705. In step S1706, the print data interpreting unit 709 determines, in accordance with restriction information set in S1705, whether the variable n exceeds the page count restriction. If the variable n does not exceed the page count restriction, the print data interpreting unit 709 shifts the process to S1702; if the variable n exceeds the page count restriction, shifts the process to S1707. When the variable n exceeds the page count restriction, the print data interpreting unit 709 discards the remaining job packets in step S1707. In the example of FIG. 11, the maximum print count is 100. Thus, when the page end command of print data is detected 100 times, the remaining data are skipped and discarded without printing them.

Figure 18:
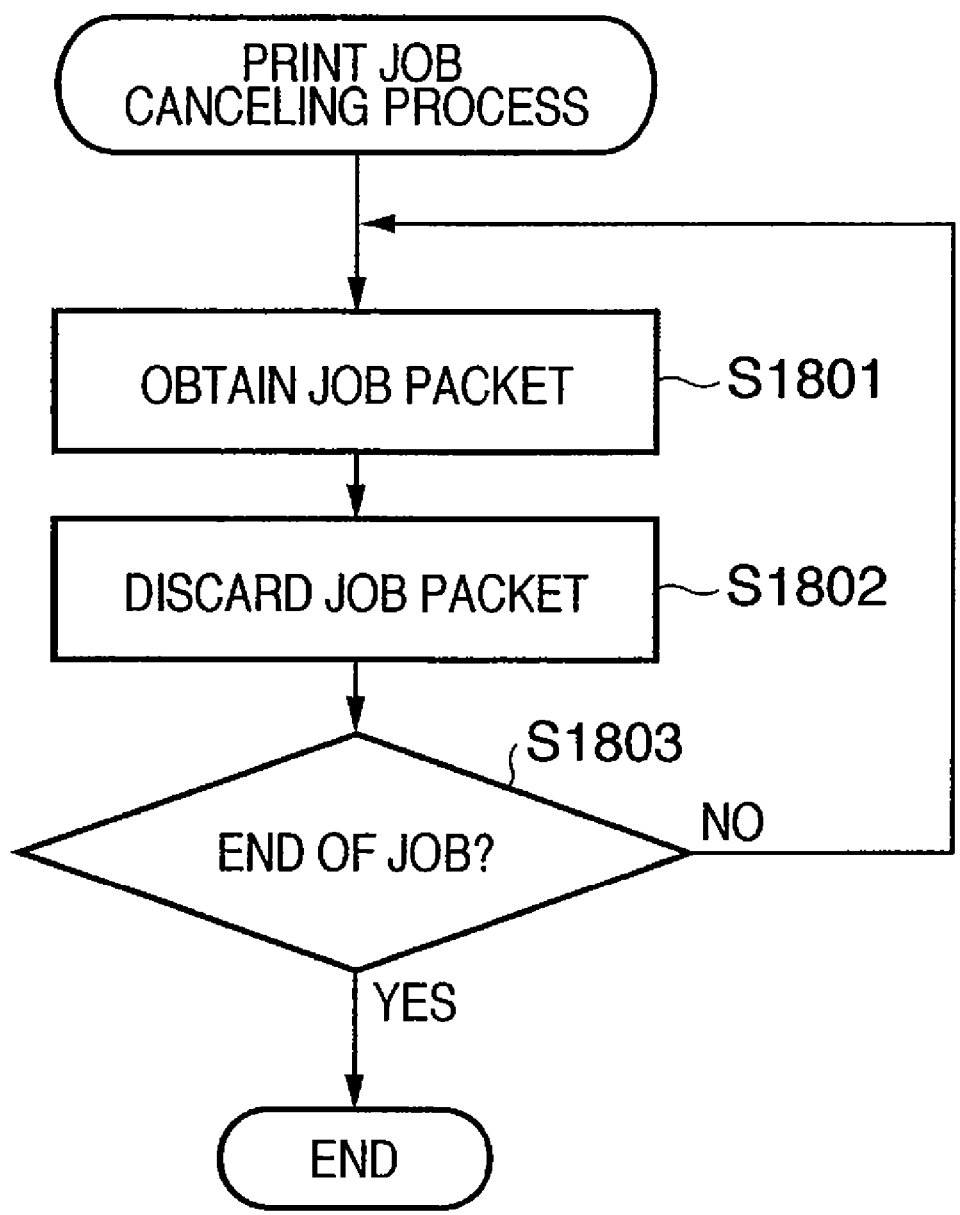
FIG. 18 is a flowchart for explaining the operation of a print job canceling unit according to the first embodiment.

The print job cancellation process of the print job canceling unit 705 when canceling a transmitted print job will be explained with reference to FIG. 18. FIG. 18 is a flowchart for explaining the process operation of the print job canceling unit according to the first embodiment. The print job canceling unit 705 starts operating at the same time as activation of the printing apparatus 103, and keeps operating until power-off of the printing apparatus 103.

When the restriction ticket determining unit 702 determines that no restriction information is contained, and invalidates printing in S1409 shown in FIG. 14, the print job canceling unit 705 receives the print job. The print job canceling unit 705 obtains a job packet in S1802, and discards the job packet in S1803. In S1804, the print job canceling unit 705 determines whether the job ends. If no job ends, the print job canceling unit 705 returns to S1802 to continue the process. If the job ends, the print job canceling-unit 705 ends the process.

Second Embodiment

The second embodiment will be described below. The first embodiment has described a technique of newly obtaining a public key when a different authentication server is recognized, that is, no public key has been obtained. It is generally assumed that a public key pair stored in the authentication server is determined uniquely. However, a public key pair may be replaced in the following situation.

For example, no previous public key may be available due to replacement of the authentication server itself. A previous public key pair may be invalid because it leaks due to attack. Alternatively, a public key may have expired.

The second embodiment will describe an improvement to the first embodiment on the assumption of these situations. The system configuration is the same as that in FIG. 1, and the internal arrangement of the printing apparatus is the same as that in FIG. 7. The second embodiment modifies the operation of a packet converting unit 704. The technique of the second embodiment different from the first embodiment will be mainly described.

Figure 19:
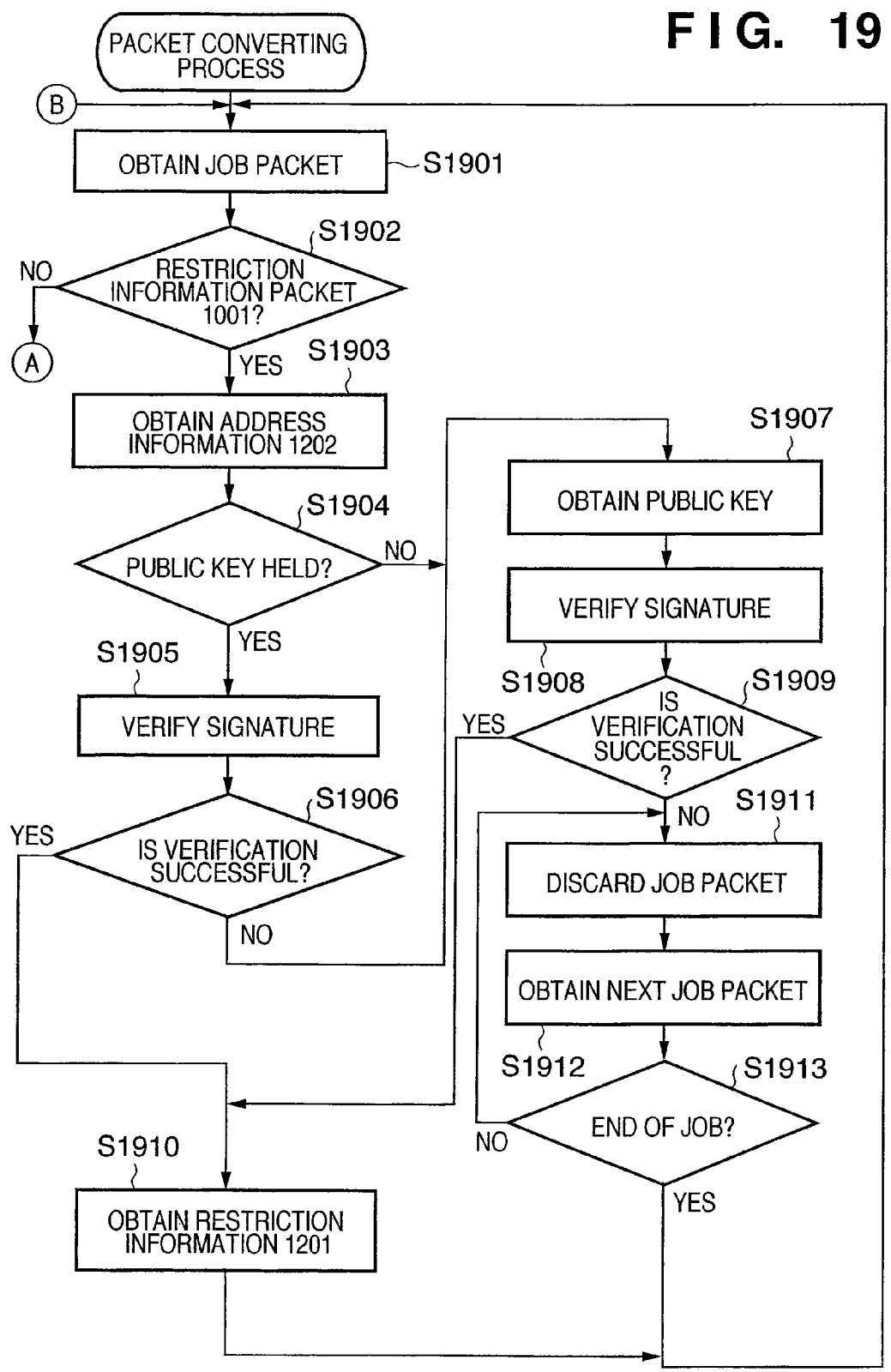
FIG. 19 is a flowchart showing the operation of a packet converting unit according to the second embodiment.

The operation of the packet converting unit 704 according to the second embodiment will be explained with reference to FIG. 19. FIG. 19 is a flowchart showing the operation of the packet converting unit according to the second embodiment. FIG. 19 explains in more detail the process in FIG. 15 according to the first embodiment. In FIG. 19, A and B indicate branches to FIG. 16, similar to the first embodiment. To avoid a repetitive description, only characteristic steps in the second embodiment will be described.

After obtaining address information of an authentication server in S1903, the packet converting unit 704 checks in step S1904 a public key storage unit 714 to confirm whether a public key corresponding to the authentication server has already been obtained. If the public key has already been obtained, the packet converting unit 704 verifies a signature with the public key in step S1905. If the packet converting unit 704 determines in step S1906 that verification in S1905 is successful, it obtains restriction information in S1910. If verification fails, the packet converting unit 704 shifts the process to S1907.

Figure 20:
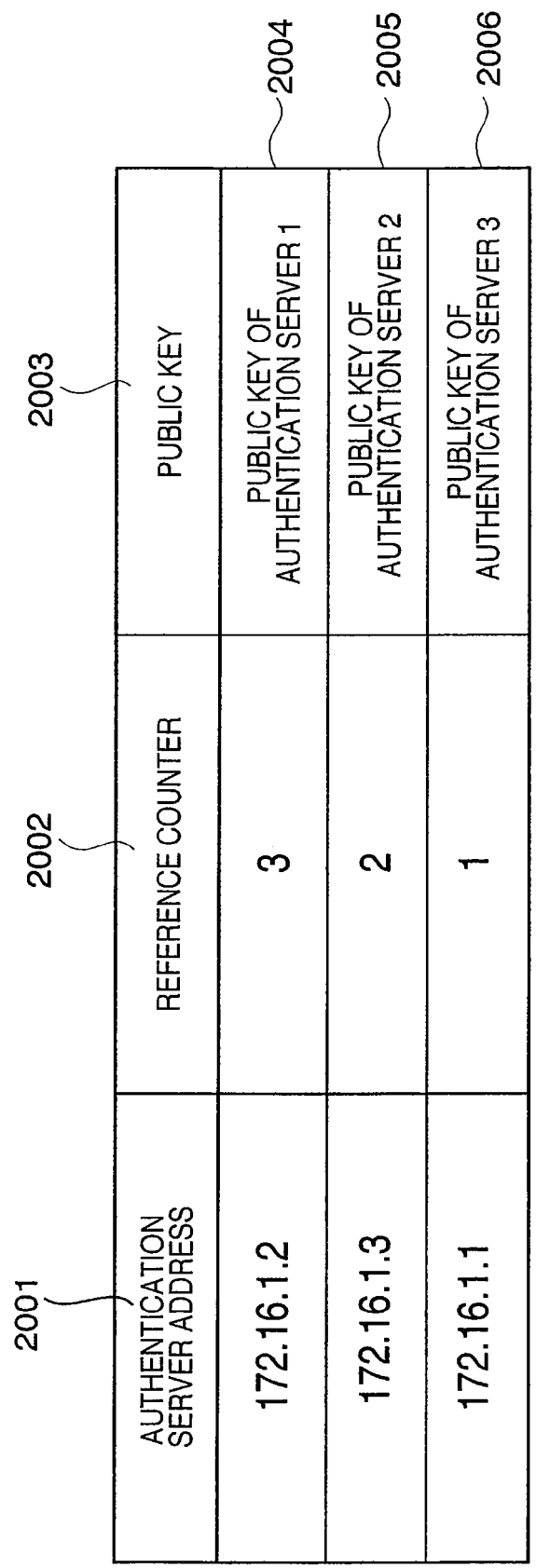
FIG. 20 is a table showing an example of a data structure stored in a public key storage unit according to the third embodiment.

If the packet converting unit 704 determines in S1904 that no public key has been obtained or verification in S1905 fails, it requests a public key obtaining unit 713 to obtain the public key, thereby obtaining the public key newly from the authentication server in step S1907. According to the second embodiment, if signature verification with the obtained public key fails, the packet converting unit 704 determines that the public key is invalid due to any of the above-described reasons, and obtains the public key again. For example, NO is obtained in S1906 when the authentication server identifier remains unchanged, but the private and public keys held in the authentication server change and the printing apparatus 103 has not held the changed public key yet, as shown in FIG. 20. The process in S1907 provides a mechanism for obtaining a public key again, so the printing apparatus need not ensure a large resource to hold decryption information. Without ensuring a large resource, the private and public keys can be freely updated by user operation, and a high-security printing system can be built.

After newly obtaining the public key, the packet converting unit 704 verifies a signature 1203 using the obtained public key in step S1908. In step S1909, similar to S1906, the packet converting unit 704 determines whether verification is successful.

As described above, according to the second embodiment, when signature verification fails with an obtained public key, the public key is obtained again from the authentication server to verify the signature. The printing system according to the second embodiment can deal with even a change of the public key in a known authentication server by obtaining the public key again.

Third Embodiment

The third embodiment will be described below. In the first and second embodiments, the printing apparatus 103 incorporates the public key storage unit 714. However, the printing apparatus 103 may not incorporate an expensive storage device such as a hard disk drive under cost restriction. Even in this case, the third embodiment can install the printing system of the present invention.

A public key storage unit 714 according to the third embodiment may be formed from a nonvolatile memory of a relatively small capacity such as a flash memory or SRAM (Static Random Access Memory). The nonvolatile memory according to the third embodiment requires a capacity to store the public keys of authentication servers at a maximum of, for example, eight destinations. According to the third embodiment, in the use of authentication servers at more than eight destinations, the ninth and subsequent destinations of new authentication servers are desirably stored by releasing the nonvolatile memory from a destination of the oldest use log (access log) among destinations which have already been stored. This operation allows the public key storage unit 714 according to the third embodiment to process authentication servers at more than eight destinations.

A public key storage process by the public key storage unit 714 will be described with reference to FIG. 20. FIG. 20 is a table showing an example of a data structure stored (held) in the public key storage unit according to the third embodiment. For descriptive convenience, the maximum number of destinations in the public key storage unit 714 is three.

The public key storage unit 714 holds authentication server address information 2001, a reference counter 2002, and a public key 2003. The reference counter 2002 holds a value representing the use order of stored public keys, that is, the public key use log (public key access log). For example, when the maximum number of stored destinations is eight, the latest referred or stored public key is 8, and the oldest referred or stored public key is 1. As shown in FIG. 20, the public key storage unit 714 stores three public keys 2004, 2005, and 2006. A case in which a printing apparatus 103 newly obtains and stores a public key in this situation will be described with reference to FIG. 21.

Figure 21:
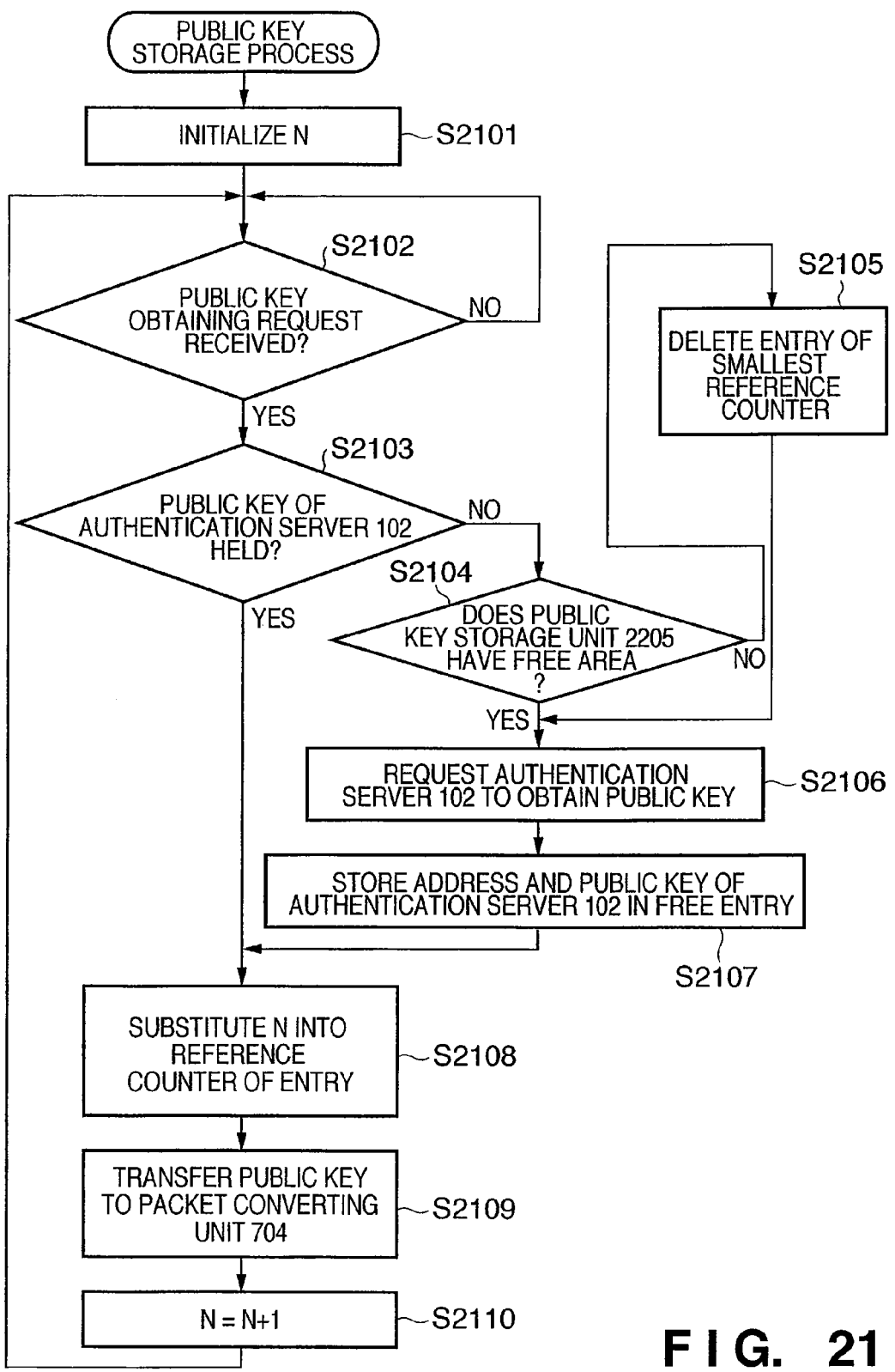
FIG. 21 is a flowchart showing the operation of the public key storage unit according to the third embodiment.

FIG. 21 is a flowchart showing the operation of the public key storage unit according to the third embodiment. In the first and second embodiments, the public key storage unit 714 simply holds a public key corresponding to an authentication server. In the third embodiment, however, the public key storage unit 714 uses a more complicated schedule, which will be explained with reference to the flowchart. The public key storage unit 714 starts operating at the same time as activation of the printing apparatus 103, and keeps operating till power-off of the printing apparatus.

In step S2101, the public key storage unit 714 initializes the variable N. The initial value is a variable for managing the log of each entry in the table of FIG. 20. The initial value is 1 when the public key storage unit 714 does not hold even one public key. When the maximum number of public keys is three and two public keys are already stored at present, the initial value is 3. When three public keys are already stored, the initial value is prepared by adding one to the maximum value of the reference counter 2002.

In step S2102, the public key storage unit 714 confirms whether it has received a public key obtaining request from a packet converting unit 704. If the public key storage unit 714 does not receive the obtaining request, it returns to S2102 again to wait for a public key obtaining request.

If the public key storage unit 714 receives a public key obtaining request, it confirms in step S2103 whether it holds the public key of the authentication server. If the public key storage unit 714 holds the public key, it stores the N value in the reference counter of a corresponding entry in step S2108. In step S2109, the public key storage unit 714 transfers the public key to the packet converting unit. In step S2110, the public key storage unit 714 adds one to the variable N.

If the public key storage unit 714 does not hold the public key in S2103, it determines in step S2104 whether there is a free area to store a public key serving as decryption information. In the case as shown in FIG. 20, there is no free area for entry. Thus, in step S2105, the public key storage unit 714 deletes a public key in an entry where the reference counter exhibits the smallest value. That is, the public key storage unit 714 searches for an authentication server of low frequency of use based on the reference counter value serving as the access log, and deletes information on the searched authentication server. In this case, the public key storage unit 714 deletes information on the public key 2006. The deleted information contains the authentication server address (authentication server identifier), the reference counter, and the public key (decryption information). The reference counter of the public key 2006 represents that the public key 2006 is not referred to recently. After the entry area becomes free, the public key storage unit 714 issues a public key obtaining request to the authentication server and obtains the public key in step S2106. After obtaining the public key, the public key storage unit 714 stores the address and public key of the authentication server in the entry of the free area in step S2107. The public key storage unit 714 shifts the process to S2108 to store the N value in the reference counter of the entry. Then, the public key storage unit 714 executes the above-described processes in S2109 and S2110.

The public key storage unit according to the third embodiment performs scheduling similar to memory caching. By scheduling, the public key storage unit 714 holds the public key of a frequently accessed authentication server, but discards that of a less frequently accessed authentication server. The printing system obtains a discarded public key again, as needed. Services can continue even with a small capacity, and a decrease in speed by obtaining a public key can be suppressed.

Fourth Embodiment

The fourth embodiment will be described. The first, second, and third embodiments have described a system which requests access restriction information in printing from the host computer 101. The fourth embodiment uses access restriction information to restrict output associated with a local job, for example, a copy job executed from a printing apparatus 103. The printing apparatus according to the fourth embodiment will be called a printing apparatus 2200.

Figure 22:
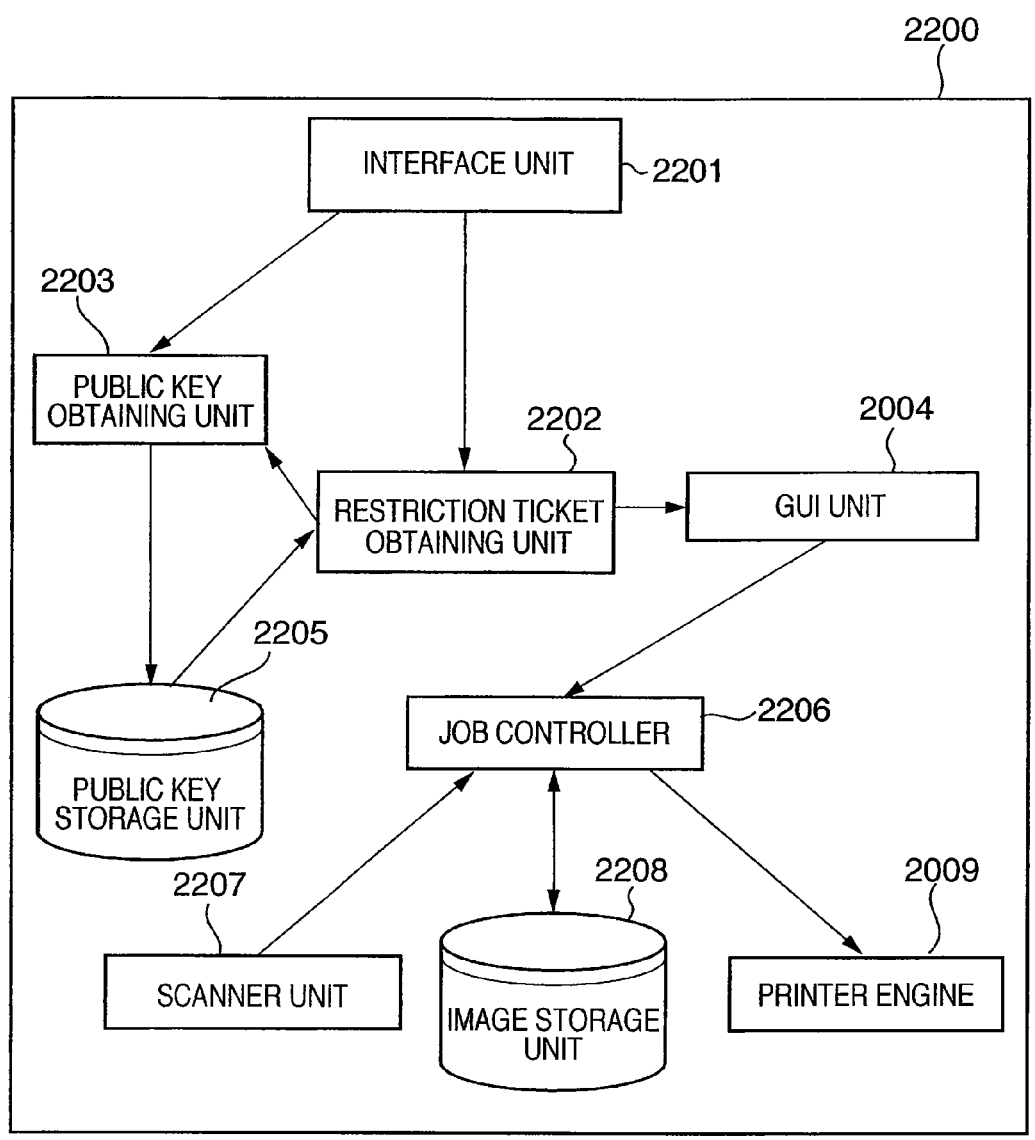
FIG. 22 is a block diagram showing an example of the arrangement of a printing apparatus according to the fourth embodiment.

Control of the printing apparatus 2200 (printing system) according to the fourth embodiment will be explained for each functional block with reference to FIG. 22. FIG. 22 is a block diagram showing an example of the arrangement of the printing apparatus according to the fourth embodiment.

The printing apparatus 2200 comprises an interface unit 2201, restriction ticket obtaining unit 2202, public key obtaining unit 2203, public key storage unit 2205, and GUI unit 2204. Further, the printing apparatus 2200 comprises a job controller 2206, scanner unit 2207, image storage unit 2208, and printer engine 2209.

The interface unit 2201 connects to a network 107 to obtain a public key from an authentication server. The public key storage unit 2205 stores public keys obtained from one or more authentication servers. The public key obtaining unit 2203 obtains a unique public key from the authentication server via the interface unit 2201.

The restriction ticket obtaining unit 2202 obtains an access restriction ticket from the authentication server and verifies a signature based on the restriction information. The GUI (Graphical User Interface) unit 2204 notifies the internal units of the apparatus of a user instruction. The job controller 2206 executes job control such as a copy process in accordance with an instruction from the GUI unit 2204. The scanner unit 2207 reads out document contents from a physical medium by an optical scanning method, and generates image data. The image storage unit 2208 temporarily stores image data generated by the scanner unit 2207 until the completion of printing. The printer engine 2209 actually prints image data stored in the image storage unit 2208 on a medium such as a print sheet by a known printing technique such as electrophotography or inkjet printing.

Figure 23:
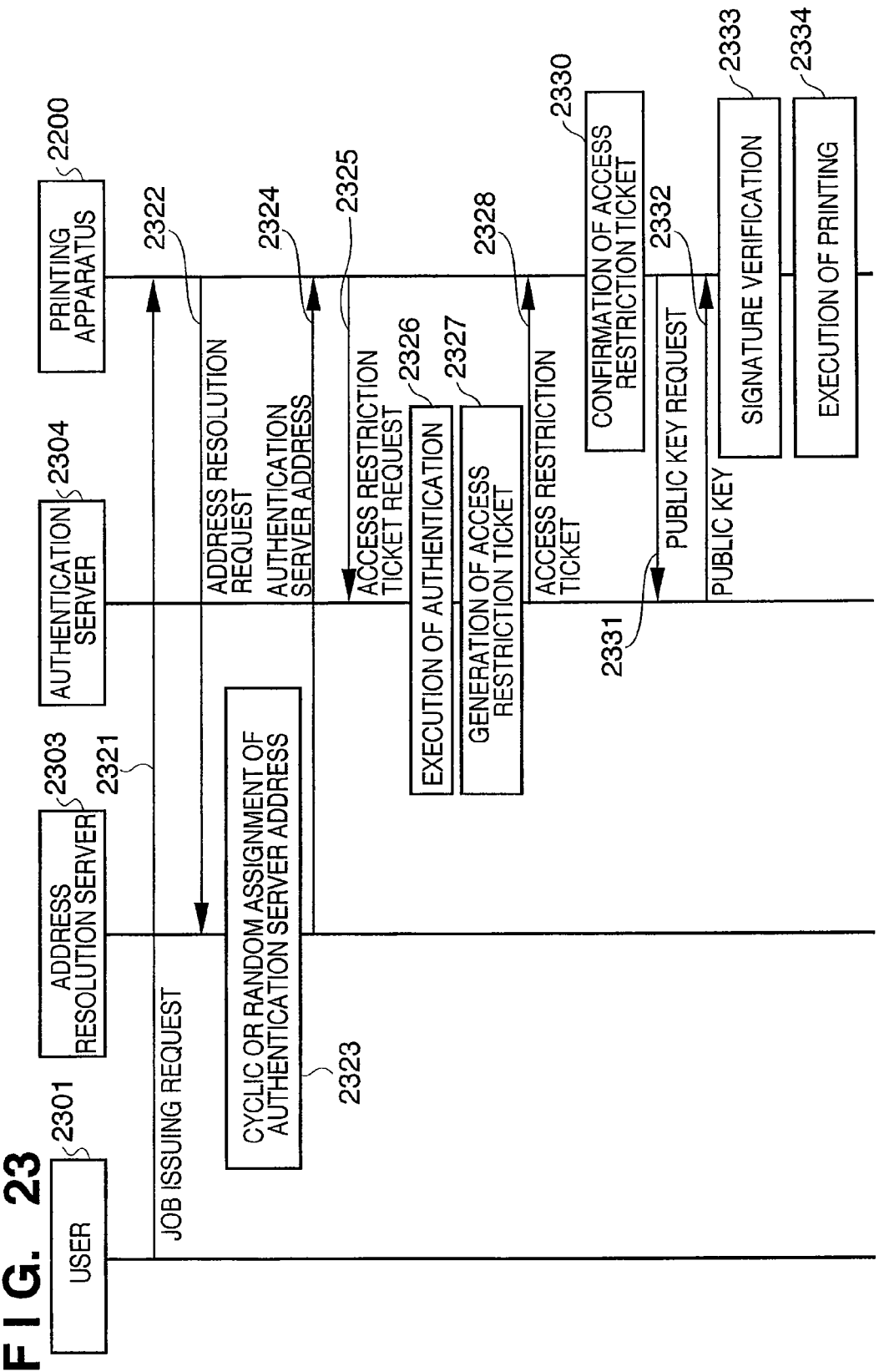
FIG. 23 is a sequence chart for explaining the process sequence of an overall system according to the fourth embodiment.

An outline of a print process in the printing system will be explained with reference to FIG. 23. FIG. 23 is a sequence chart for explaining the overall system according to the fourth embodiment. Reference numeral 2301 denotes a user, reference numeral 2303 denotes an address resolution server, reference numeral 2304 denotes an authentication server, and reference numeral 2200 denotes the printing apparatus. A description which overlaps FIG. 4 will be omitted.

In step S2321, the user 2301 requests the printing apparatus 2200 to issue a copy job under his authorization. In step S2322, the printing apparatus 2200 requests the address resolution server 2303 to resolve the address of the authentication server in order to print. In step S2323, the address resolution server 2303 selects an arbitrary one of authentication servers cyclically or at random. In step S2324, the address resolution server 2303 returns the address to the printing apparatus 2200.

In step S2325, the printing apparatus 2200 requests the authentication server 2304 to issue an access restriction ticket. Also in this case, the printing apparatus 2200 sends an inquiry for access restriction information by transmitting user authentication information such as the user name and password of the user 2301 to the authentication server 2304. The user authentication information inquiry timing may be the job request timing or the timing when the user performs a login operation from the operation unit of the printing apparatus 2200. In step S2326, the authentication server 2304 performs authentication using authentication information. If authentication is successful, the authentication server 2304 generates an access restriction ticket in step S2327. At this time, the authentication server 2304 describes its address in authentication server address information 1202 in FIG. 12. Further, the authentication server 2304 attaches, to a signature 1203, the result of a digital signature with the private key of a public key pair held in the authentication server itself. In step S2308, the authentication server 2304 returns the access restriction ticket to the printing apparatus 2200. In steps S2330 to S2334, the printing apparatus 2200 executes the same processes as those in steps S410 to S414 in FIG. 4.

Figure 24:
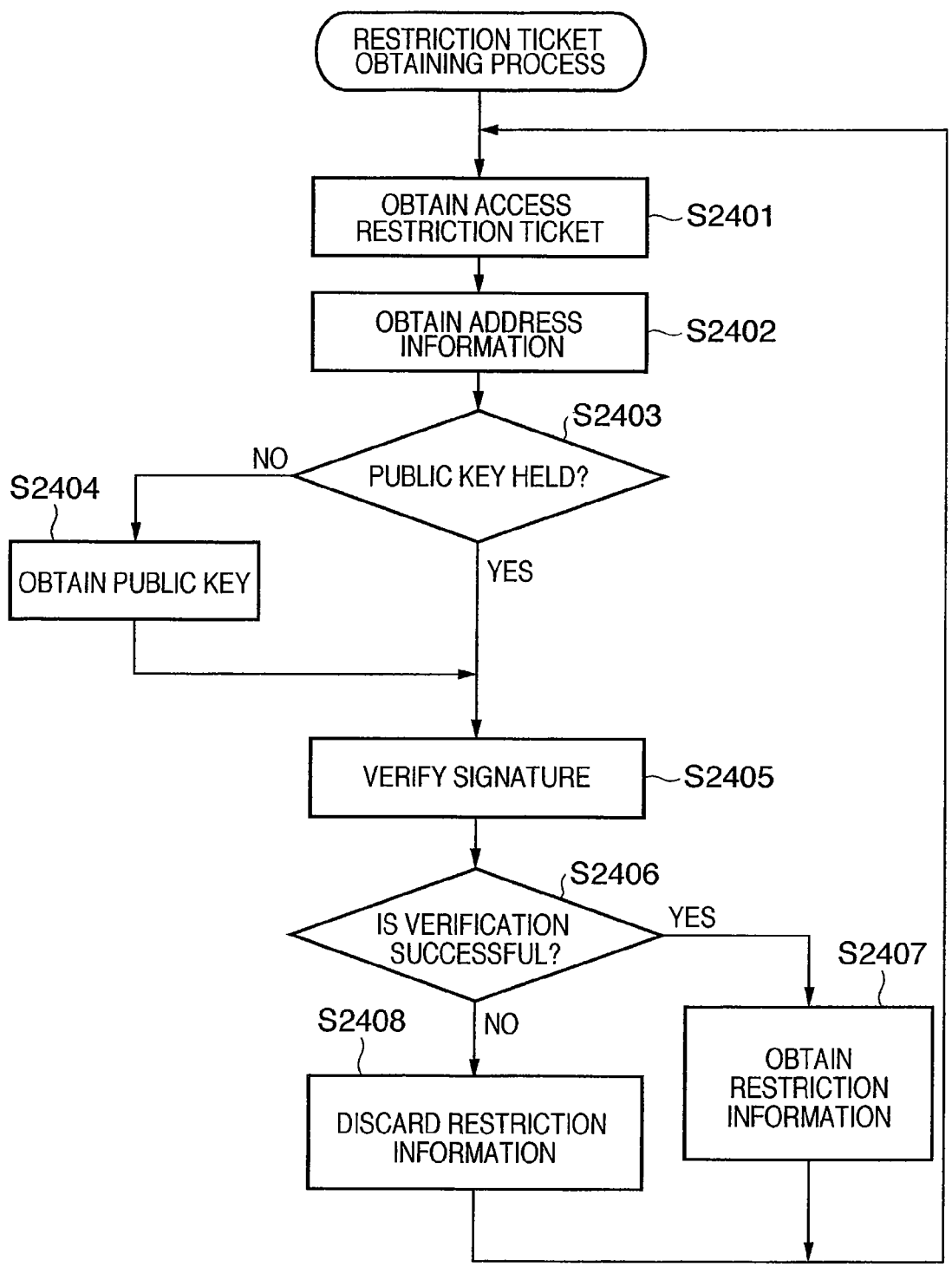
FIG. 24 is a flowchart showing the operation of a ticket obtaining unit according to the fourth embodiment.

The operation of the ticket obtaining unit will be described with reference to FIG. 24. FIG. 24 is a flowchart showing the operation of the ticket obtaining unit according to the fourth embodiment. The restriction ticket obtaining unit 2202 starts operating at the same time as activation of the printing apparatus 2200, and keeps operating until power-off of the printing apparatus 2200.

In step S2401, the printing apparatus 2200 obtains an access restriction ticket from an authentication server with the right of a user who operates the printing apparatus 2200. In step S2402, the restriction ticket obtaining unit 2202 obtains the authentication server address information 1202 contained in the access restriction ticket. The authentication server address information 1202 stores the address of the authentication server which has issued the access restriction ticket.

In step S2403, the restriction ticket obtaining unit 2202 then checks the public key storage unit 2205 to confirm whether a public key corresponding to the authentication server has already been obtained. If no public key has been obtained, the restriction ticket obtaining unit 2202 requests the public key obtaining unit 2203 to obtain the public key in step S2404 based on the authentication server address information contained in the access restriction ticket. The public key obtaining method is the same as those in steps S411 and S1504, and a detailed description thereof will be omitted. As the method of obtaining a public key as decryption information again, the same process as S1904 to S1909 in FIG. 19 is also applicable to the printing apparatus 103. The held public key update process described with reference to FIG. 21 is similarly applicable to the printing apparatus 103.

In step S2405, the restriction ticket obtaining unit 2202 verifies the signature 1203 using the obtained public key serving as the decryption key. If verification in S2405 is successful, the restriction ticket obtaining unit 2202 obtains and stores restriction information 1201 in step S2407, and shifts the process to S2401. If verification fails, the restriction ticket obtaining unit 2202 discards the access restriction ticket in S2408, and shifts the process to S2401. As a result, no restriction information can be obtained when verification fails. If verification is successful, the GUI unit 2204 uses the stored restriction information.

Figure 25:
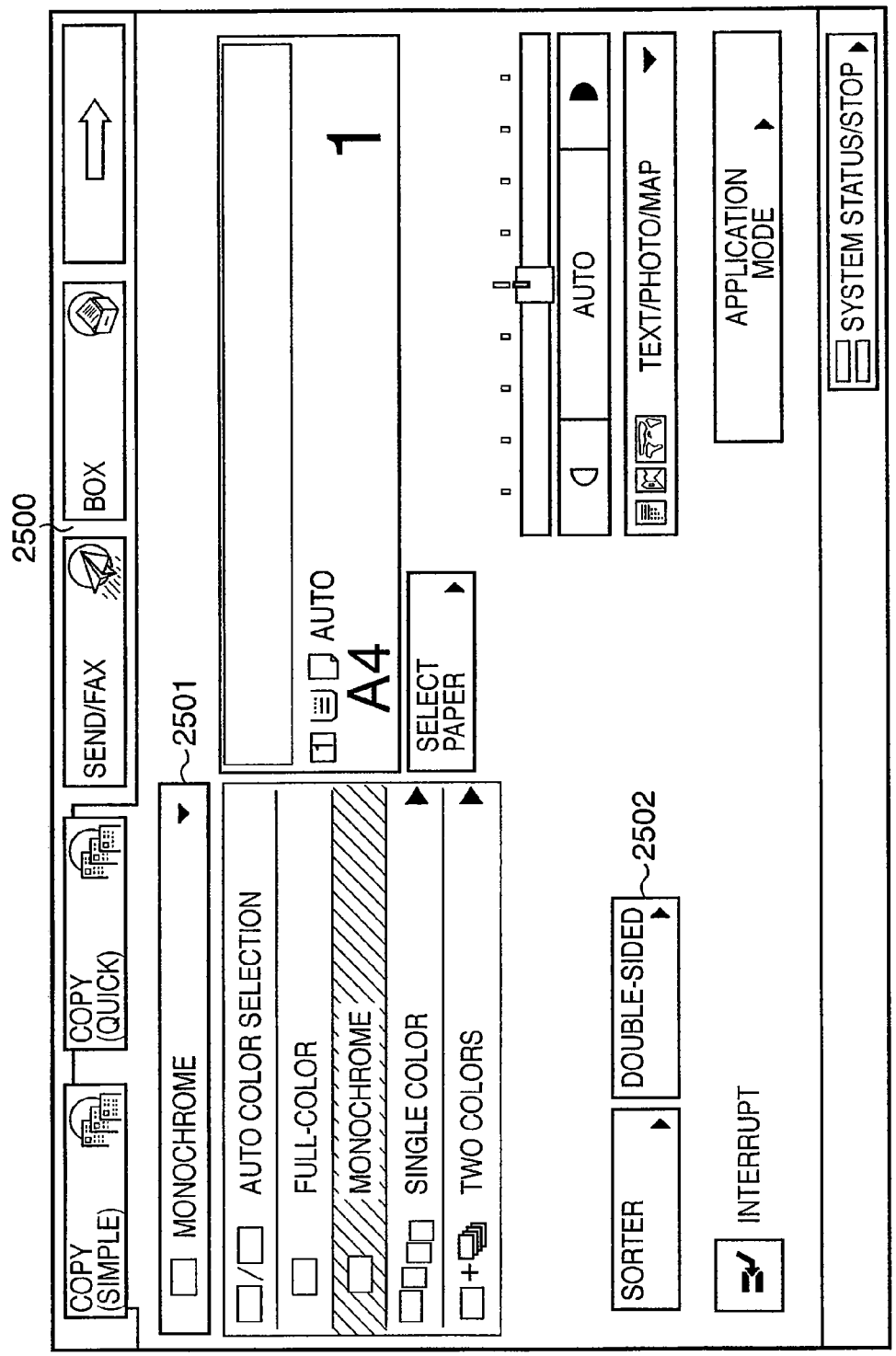
FIG. 25 is a view showing the appearance of a GUI unit according to the fourth embodiment.

An outline of the GUI unit 2204 will be explained with reference to FIG. 25. FIG. 25 is a view showing the appearance of the GUI unit according to the fourth embodiment. An operation panel (not shown) displays a GUI window 2500. The GUI window 2500 has a pull-down menu 2501 representing a color selection when executing copy operation, and a button 2502 to select double-sided printing.

If there is restriction information obtained before displaying the window, these operation buttons may restrict an operation using the restriction information. For example, when restriction information as shown in FIG. 11 is imposed, the description "STRICT_MONOCOLOR=TRUE" permits only monochrome printing, so the user cannot select color printing from the pull-down menu 2501. In this case, the selection item of color printing may be deleted or grayed out from the pull-down menu 2501 to explicitly inhibit the selection. Even when the user can select color printing, a dialog "no color printing is permitted." may be displayed in printing to stop the print process.

The description "STRICT_DUPLEX=TRUE" inhibits single-sided printing, so the user cannot designate single-sided printing with the button 2502. In this case, the selection item of single-sided printing may be deleted or grayed out from button selection items to explicitly inhibit the selection. Even when the user can select single-sided printing, a dialog "no single-sided printing is permitted." may be displayed in printing to stop the print process.

The GUI shown in FIG. 25 can change between users. That is, if the login user or the like changes in the inquiry of user authentication information described in S2325, the authentication server 2304 sends back an access restriction ticket of different contents in S2328, and the GUI in FIG. 25 is controlled to a different display.

As described above, the present invention can simultaneously cope with a plurality of print requests by issuing access restriction tickets from respective authentication servers in an office where many host computers or devices are installed.

When verifying the signatures of access restriction tickets issued from a plurality of authentication servers, the printing apparatus can identify which public keys of the authentication servers are used to verify the signatures. For example, there is a method using one public key between authentication servers. In this case, a public key pair (public and private keys) must be shared between authentication servers. For example, a public key pair may be exported in the PKCS#12 (Public Key Cryptography Standard No. 12) form, and the administrator may send a floppy® disk storing it to the destination. This method requires the administrator to do cumbersome manual work. In general, it is not desirable to output the private key of a public key pair outside the authentication server in any form. In this case, the private key may not be completely protected. If the device fails or is disassembled by a third party in replacement, and a public key pair leaks, this influences the overall system. To avoid this problem, public key pairs held by respective authentication servers are desirably different from each other. The fourth embodiment can solve this problem.

The fourth embodiment can build a user-friendly printing system capable of distributing the authentication server system, and performing an authentication process smoothly, stably in correspondence with the distribution. Restriction information issued from an authentication server can restrict the number of output sheets of a print job. Hence, the number of print sheets by a user can be restricted to suppress unregulated printing and contribute to TCO reduction.

The printing system can suppress output of print jobs having no restriction information, and suppress execution of printing against the restriction policy.

The printing system can force double-sided designation, page layout designation, and monochrome designation of a print job by restriction information issued from an authentication server. The printing system can suppress unregulated printing and contribute to TCO reduction.

In the printing system, even when a plurality of authentication servers hold different public key pairs, the printing apparatus holds a public key based on address information of each authentication server, and if necessary, obtains a public key from an authentication server. The printing system can expand a plurality of authentication servers without causing the user to be aware of this, and can distribute the loads of many print service requests.

To automatically obtain the public key of an authentication server by the printing apparatus, as needed, the administrator only installs the authentication server in the printing system without transferring a public key pair. To prevent leakage of a private key from the authentication server, the printing system prevents malicious attack by users including even the administrator, and can maintain advanced security.

Another Embodiment

Another embodiment will be described. In the above embodiments, the access restriction ticket contains function restriction information which sets whether to permit/inhibit the use of each function. Based on this function restriction information, the printing apparatus 103 determines whether to execute a requested job. However, the authentication server 102 can also determine whether to execute a job. In this case, the content of the access restriction ticket is only information representing whether to permit printing by the printing apparatus 103 in accordance with the contents of a user-designated print request. The contents of the print request include whether to print in color, whether to permit a stapling process, and whether to print a given number of sheets.

Figure 26:
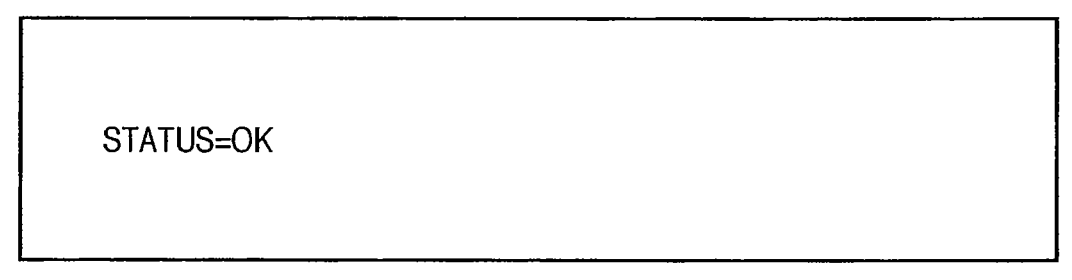

In this case, the authentication server 102 obtains information on a job to be executed by the user 400 from the host computer 101 or printing apparatus 103 when accepting an access restriction ticket request. The job information includes information on functions (e.g., the number of copies, color/monochrome, and Nin1) executable by the printing apparatus 103. Based on the job information and the access restriction information shown in FIG. 5, the authentication server 102 determines whether a user can execute a job. If the job to be executed contains a restriction matter, the authentication server 102 issues an access restriction ticket which inhibits execution of the job. If the job does not contain any restriction matter, the authentication server 102 issues an access restriction ticket to permit execution of the job. FIG. 26 shows an example of this access restriction ticket. In FIG. 26, the access restriction ticket contains "Status=OK" representing permission to execute a job.

With the access restriction ticket, if the signature is verified successfully, the printing apparatus 103 can only check the contents of job execution rejection to determine whether to execute a requested job.

Figure 27:
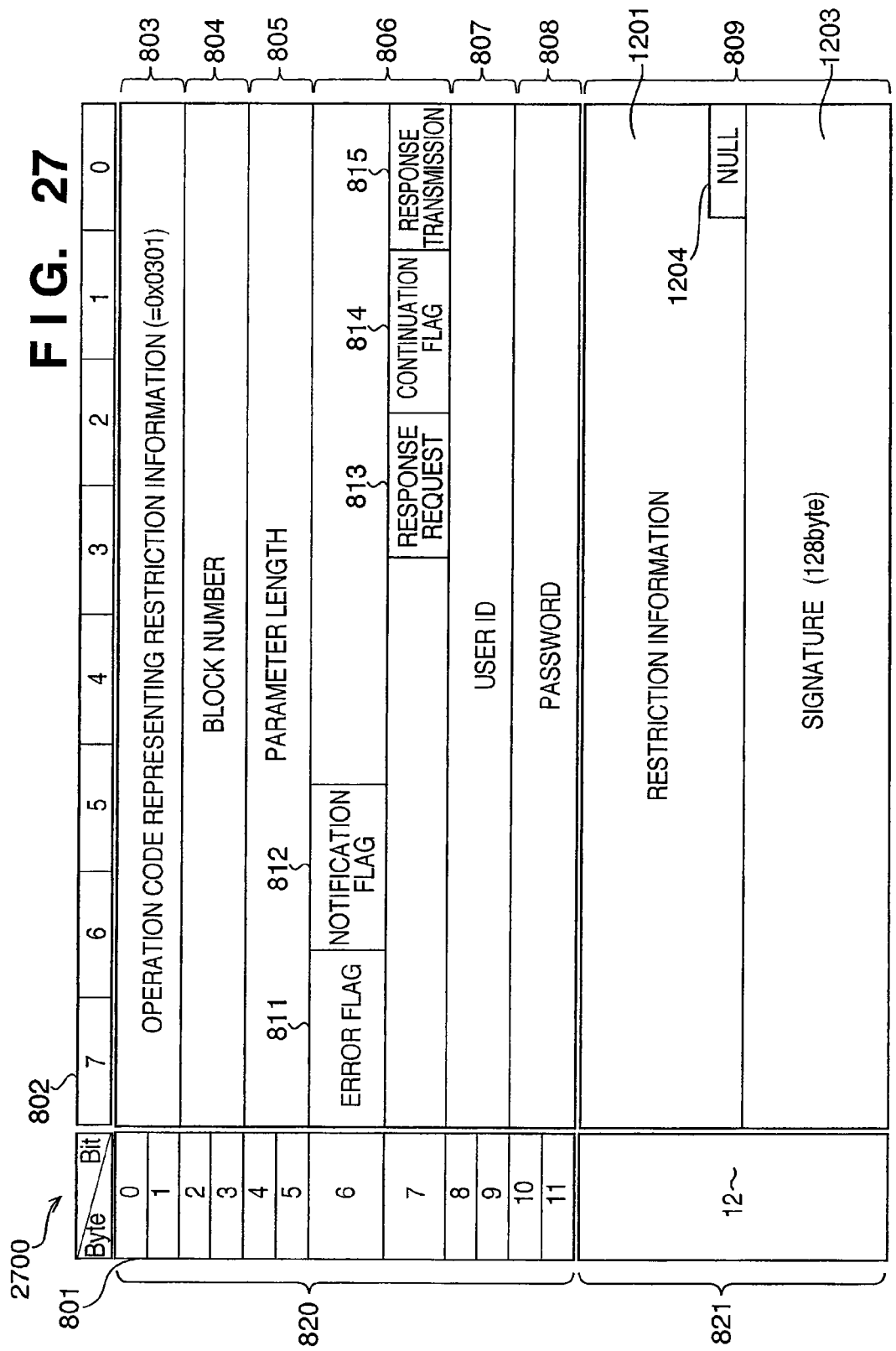
FIG. 27 is a view showing the job packet of an access restriction ticket according to the embodiment.

An example in which access restriction information issued from an authentication server does not contain its identifier will be explained with reference to FIGS. 27 and 28. FIG. 27 is a view showing the job packet of the access restriction ticket according to the embodiment.

Compared to a job packet representing the restriction information 1001 in FIG. 12, a job packet representing restriction information 2700 does not contain any authentication server address information 1202. As described above, the authentication server address information 1202 contains information having the identifier of each authentication server. If the job packet does not contain this information, the client (host computer 101) must add an identifier representing the authentication server to a job packet other than that of the restriction information 2700. The client must hold the identifiers of a plurality of authentication servers in advance.

Figure 28:
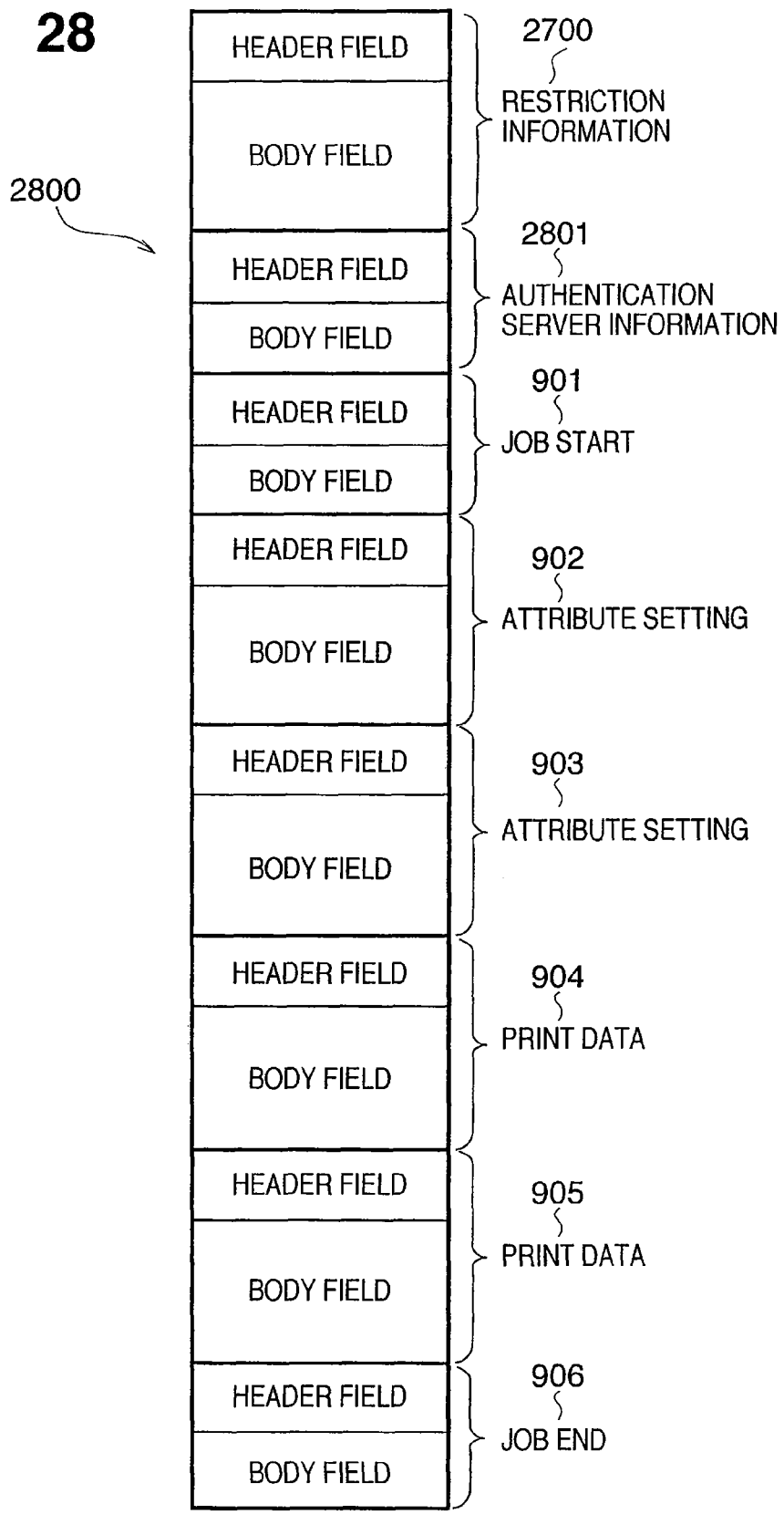
FIG. 28 is a view showing the structure of a print job according to the embodiment.

FIG. 28 is a view showing the structure of a print job according to the embodiment. As shown in FIG. 28, a print job 2800 requested from the client contains job packets representing the restriction information 2700, authentication server information 2801, a job start 901, attribute settings 902 and 903, print data 904 and 905, and a job end 906. The identifier of a target authentication server is added from information held in the client in advance to the job packet representing the authentication server information 2801.

According to the present invention, the authentication server need not always add its identifier in response to an access restriction ticket issuing request. In this case, however, the client or the like must hold the identifier of the authentication server.

Various embodiments have been described above. The present invention is applicable to a system including a plurality of devices or an apparatus formed by a single device. For example, the present invention is applicable to a computer system including a printer, facsimile apparatus, PC, server, and client.

The present invention is also achieved by supplying a software program for implementing the functions of the above-described embodiments to a system or apparatus directly or from a remote place, and reading out and executing the supplied program codes by the computer of the system or the like.

The present invention is therefore implemented by program codes installed in the computer in order to implement the functions and processes of the present invention by the computer. That is, the present invention includes a computer program for implementing functions and processes.

In this case, the present invention can be implemented as a program such as an object code, a program executed by an interpreter, or script data supplied to an OS as long as a program function is attained.

A recording medium for supplying the program includes a flexible disk, hard disk, optical disk, magnetooptical disk, MO, CD-ROM, CD-R, and CD-RW. The recording medium also includes a magnetic tape, nonvolatile memory card, ROM, and DVD (DVD-ROM and DVD-R).

The program may be downloaded from the homepage of the Internet using the browser of the client computer. That is, the computer program of the present invention or a compressed file containing an automatic installing function may be downloaded from the homepage to a recording medium such as a hard disk. The program can also be implemented by grouping program codes which form the program of the present invention into a plurality of files, and downloading the files from different homepages. That is, the present invention also incorporates a WWW server which allows a plurality of users to download the program files for implementing functional processes of the present invention by a computer.

The program of the present invention may be encrypted, stored in a storage medium such as a CD-ROM, and distributed to a user. Only a user who satisfies predetermined conditions is prompted to download decryption key information from a homepage via the Internet. The user decrypts the encrypted program using the key information, executes the program, and installs it in the computer.

The functions of the above-described embodiments may also be implemented when the computer executes the readout program codes. Also, an OS or the like running on the computer may perform some or all of the actual processes based on the instructions of the program. Also in this case, the functions of the above-described embodiments are implemented.

The program read out from the recording medium may be written in the memory of a function expansion board inserted into the computer or the memory of a function expansion unit connected to the computer. The CPU of the function expansion board or function expansion unit may perform some or all of actual processes based on the instructions of the program. The functions of the above-described embodiments are also implemented in this manner.

The present invention can provide a printing system which reduces cost while stably operating an authentication server function associated with a print process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-111366 filed on Apr. 13, 2006, which is hereby incorporated by reference herein in its entirety.

What is claimed is:

1. A printing system including a plurality of authentication servers, a client communicable with the authentication servers, and a printing apparatus,
the client comprising:
an accessing unit adapted to gain access with user authentication information to any authentication server assigned among the plurality of authentication servers; and
a print job output unit adapted to output, to the printing apparatus, a print job containing access restriction information sent back from the any authentication server in response to the access,
the authentication server comprising:
an issuing unit adapted to issue, to the client on the basis of the user authentication information notified from the client, an identifier of the authentication server and access restriction information having undergone an encryption process with encryption information held in the authentication server, and
the printing apparatus comprising:
a holding unit adapted to hold decryption information to decrypt the encryption process performed on the received access restriction information;
a determining unit adapted to determine whether said holding unit holds the decryption information corresponding to the identifier of the any authentication server contained in the received print job;
an obtaining unit adapted to, if said determining unit determines that said holding unit does not hold the decryption information, obtain the decryption information corresponding to the identifier by requesting the decryption information to the authentication server that is identified by the identifier;
a verifying unit adapted to perform verification on the basis of the decryption information obtained by said obtaining unit or the held decryption information; and
a job execution controlling unit adapted to control execution of a print job on the basis of the verification by said verifying unit.

2. The system of claim 1, wherein the printing apparatus comprises
a deciding unit adapted to decide whether the access restriction is added to the received print job, and
a job cancellation unit adapted to cancel the received print job when said deciding unit decides that the access restriction information is not added to the receiving print job, or when said verifying unit fails in verifying a digital signature on the basis of the decryption information.

3. The system according to claim 1, wherein said obtaining unit obtains the decryption information again from the authentication server and stores the decryption information in said holding unit on the basis of whether the verification by said verifying unit is successful or fails, and
said verifying unit performs verification again in accordance with the decryption information obtained again.

4. The system according to claim 1, wherein said obtaining unit determines a free space of said holding unit, and when the decryption information cannot be stored, searches for an authentication server of low use frequency on the basis of an access log, discards an identifier and decryption information of the searched authentication server, and stores decryption information of a new authentication server in said holding unit.

5. A printing system comprising:
an inputting unit adapted to input access restriction information issued in accordance with user authentication information from any authentication server assigned among a plurality of authentication servers;
an obtaining unit adapted to determine, on the basis of the access restriction information input by said inputting unit, whether decryption information corresponding to the assigned any authentication server is held, and if determining that the decryption information is not held, obtain the decrypted information corresponding to the assigned any authentication server by requesting the decryption information to the assigned any authentication server;
a verifying unit adapted to perform verification on the basis of the decrypted information by said obtaining unit or the held decryption information; and
a job execution controlling unit adapted to control execution of a job on the basis of the verification by said verifying unit.

6. The system according to claim 5, further comprising an output unit adapted to output, to a printing apparatus, a print job containing an identifier of the any authentication server and access restriction information having undergone an encryption process with encryption information held in the any authentication server,
wherein said obtaining unit makes the determination by referring to the identifier of the any authentication server contained in the received print job.

7. A method for controlling a printing system including a plurality of authentication servers, a client communicable with the authentication servers, and a printing apparatus, comprising the steps of:
gaining access with the user authentication information to any authentication server assigned among the plurality of authentication servers;
issuing, on the basis of the notified user authentication information, an identifier of the authentication server and access restriction information having undergone an encryption process with encryption information held in the authentication server;
outputting a print job containing the issued access restriction information to the printing apparatus;
determining whether a holding unit adapted to hold decryption information to decrypt the encryption process performed on the received access restriction information holds the decryption information in correspondence with the identifier of the any authentication server containing in the received print job;
obtaining the decryption information corresponding to the identifier if the holding unit is determined in the determining step not to hold the decryption information corresponding to the identifier by requesting the decryption information to the authentication server that is identified by the identifier;
performing verification on the basis of the decryption information obtained in the obtaining step or the held decryption information; and
controlling execution of a print job on the basis of the verification in the verifying step.

8. The method according to claim 7, further comprising the steps of:
deciding whether the access restriction information is added to the received print job; and
cancelling the received print job when the access restriction information is decided in the deciding step not to be added to the received print job, or when verification of a digital signature on the basis of the decryption information fails in the verifying step.

9. The method according to claim 7, wherein
in the obtaining step, the decryption information is obtained again from the authentication server and stored in the holding unit on the basis of whether the verification in the verifying step is successful or fails, and
in the verifying step, verification is performed again in accordance with the decryption information obtained again.

10. The method according to claim 7, wherein
in the obtaining step, a free space of the holding unit is determined, and when the decryption information cannot be stored, an authentication server of low use frequency is searched for on the basis of an access log, and an identifier and decryption information of the searched authentication server are discarded to store decryption information of a new authentication server in the holding unit.

11. A method for controlling a printing system, comprising the steps of:
inputting access restriction information issued in accordance with user authentication information from any authentication server assigned among a plurality of authentication servers;
determining, on the basis of the input access restriction information, whether decryption information corresponding to the assigned any authentication server is held, and if determining that the decryption information is not held, obtaining the decryption information corresponding to the assigned any authentication server by requesting the decryption information to the assigned any authentication server;
performing verification on the basis of the decryption information obtained step or the held decryption information; and
controlling execution of a job on the basis of the verification in the verifying step.

12. The method according to claim 11, further comprising the step of outputting, to a printing apparatus, a print job containing an identifier of the any authentication server and access restriction information having undergone an encryption process with encryption information held in the any authentication server, wherein
in the obtaining step, the determination is made by referring to the identifier of the authentication server contained in the received print job.

13. A computer-readable non-transitory storage medium storing a computer program for causing a computer to execute a method for controlling a printing system including a plurality of authentication servers, a client communicable with the authentication servers, and a printing apparatus, the computer program comprising the steps of :
gaining access with the user authentication information to any authenticated server assigned among the plurality of authenticated servers;
issuing, on the basis of the notified user authentication information, and identifier of the authentication server and access restriction information having undergone an encryption process with encryption information held in the authentication server;
outputting a print job containing the issued access restriction information to the printing apparatus;
determining whether a holding unit adapted to holding decryption information to decrypt the encryption process performed on the received access restriction information holds the decryption information in correspondence with the identifier of the any authentication server contained in the received print job;
obtaining the decrypted information corresponding to the identifier if the holding unit is determined in the determining step not to hold the decryption information corresponding to the identifier by requesting the decryption information to the authentication server that is identified by the identifier;
performing verification on the basis of the decryption information obtained in the obtaining step or the held decryption information; and
controlling execution of a print job on the basis of the verification in the verifying step.

14. A computer-readable non-transitory storage medium storing a computer program for causing a computer to execute a method for controlling a printing system, the computer program comprising the steps of:

inputting access restriction information issued in accordance with user authentication information from any authentication server assigned among a plurality of authentication servers;

determining, on the basis of the input access restriction information, whether decryption information corresponding to the assigned any authentication server is held, and if determining that the decryption information is not held, obtaining the decryption information corresponding to the assigned any authentication server by requesting the decryption information to the assigned any authentication server;

performing verification on the basis of the decryption information obtained step or the held decryption information; and controlling execution of a job on the basis of the verification in the verifying step.

* * * * *